(12) United States Patent
Shavers et al.

(10) Patent No.: US 7,096,150 B2
(45) Date of Patent: Aug. 22, 2006

(54) METHOD AND APPARATUS FOR CORRECTING TIRE NONUNIFORMITY

(75) Inventors: Daniel Christian Shavers, Canton, OH (US); Douglas Ashley Swift, Hudson, OH (US); George Timothy Watts, North Canton, OH (US); Robert Dean Irwin, Uniontown, OH (US); Gary Wayne Corder, Akron, OH (US); Ronald Thomas Dillard, Akron, OH (US); Arthur Warner Moll, Akron, OH (US); Robert Thomas Irwin, North Canton, OH (US); Leonard Raymond Holm, Hartville, OH (US); Nguyen Bau, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 20 days.

(21) Appl. No.: 10/634,077

(22) Filed: Aug. 4, 2003

(65) Prior Publication Data

US 2004/0068374 A1   Apr. 8, 2004

(51) Int. Cl.
    *G01B 5/08* (2006.01)
    *B29D 30/68* (2006.01)
(52) U.S. Cl. .......................... 702/157; 157/13
(58) Field of Classification Search .......... 702/157, 702/167, 75, 41; 73/146, 75; 451/28; 400/323; 157/13

See application file for complete search history.

(56) References Cited

U.S. PATENT DOCUMENTS

| | | | | |
|---|---|---|---|---|
| 3,003,545 | A * | 10/1961 | Peacock | 157/13 |
| 3,848,501 | A * | 11/1974 | Kuts | 83/471.3 |
| 3,914,907 | A * | 10/1975 | Hofelt et al. | 451/28 |
| 5,485,406 | A * | 1/1996 | Wada et al. | 702/167 |
| 6,170,324 | B1 | 1/2001 | Reese et al. | 74/146 |
| 6,237,402 | B1 * | 5/2001 | Reese | 73/146 |
| 6,258,189 | B1 | 7/2001 | Sakamoto et al. | 156/64 |
| 6,615,144 | B1 * | 9/2003 | Williams et al. | 702/41 |
| 6,739,186 | B1 * | 5/2004 | Schartz et al. | 73/146 |
| 2002/0177964 | A1 * | 11/2002 | Shteinhauz | 702/75 |

* cited by examiner

*Primary Examiner*—Michael Nghiem
*Assistant Examiner*—Xiuqin Sun
(74) *Attorney, Agent, or Firm*—June E. Rickey; David L. King

(57) ABSTRACT

A method and apparatus 100 for correcting tire nonuniformity is disclosed. The invention is particularly suited for correcting tread runout and connicity problems for large off-road tires. Multiple measurements are taken in multiple circumferentially spaced planes which enable data to be fed into a computer which predicts an optimal profile to correct tire non-uniformities using preset rules. A virtual template directs correction of the tire profile.

10 Claims, 22 Drawing Sheets

0— START UP

1— HOME MACHINE ELEMENTS OPERATOR PRESS HOME AXES BUTTON.

2— LOCATE TIRE, RAISE ON LIFT, AND CHUCK TIRE.

3— ENTER PROCESS DATA INTO COMPUTER.

4— MOVE LASER TO MOLD SPLIT LINE, ADJUST W/VERNIER, PRESS BUTTON TO LOCK DOWN CARRIAGE.

5— ADJUST LASER Y-AXIS INTO POSITION FOR NEXT SIZE DIAMETER TIRE.

6— ROTATE TIRE SO LASER IS JUST BEFORE 1ST LUG AND RESET DRUM ENCODER TO 0-DEGREES.

7— PRESS TAKE RUNOUT MEASUREMENT PB, TIRE ROTATES AND MACHINE COLLECTS DATA.

8A— IS MOLD SPLIT AT CENTERLINE (NO/YES).

8B— MOVE CARRIAGE TO CORRECT POSITION.

9— DO THE FOLLOWING CALCULATIONS ON DATA
    1) FIND THE # OF LUGS
    2) LUG AVERAGING ROUTINE (1 VALUE/LUG)
    3) FIND LOW LUG VALUE, HIGH LUG
    4) MEASURE RUN-OUT AND VERIFY
    5) FLAT SPOT CHECKING
    6) RADIAL RUN-OUT TEST (5 HARMONICS)

10— IS TIRE A TRUING CANDIDATE?

11— TURN OFF CL LASER, UNLOCK/MOVE LASER TO <u>RIGHT-TANGENT</u> PT., PRESS BUTTON TO LOCK DOWN CARRIAGE.

12— PRESS TAKE RUNOUT MEASUREMENT PB, TIRE ROTATES AND MACHINE COLLECTS DATA.

FIG-19A

13– UNLOCK/MOVE LASER TO RIGHT-SHOULDER PT., PRESS BUTTON TO LOCK DOWN CARRIAGE.

14– PRESS TAKE RUNOUT MEASUREMENT PB, TIRE ROTATES AND MACHINE COLLECTS DATA.

14A– CONTINUE (NO/YES)

15– DO CALCULATIONS ON RIGHT-TANGENT DATA
      1) FIND THE # OF LUGS
      2) LUG AVERAGING ROUTINE (1 VALUE/LUG)
      3) FIND LOW LUG VALUE
      4) MEASURE RUN-OUT AND VERIFY
      5) FLAT SPOT CHECKING

16– UNLOCK/MOVE LASER TO LEFT-TANGENT PT., PRESS BUTTON TO LOCK DOWN CARRIAGE.

17A– CONTINUE (NO/YES)

17– PRESS TAKE RUNOUT MEASUREMENT PB, TIRE ROTATES AND MACHINE COLLECTS DATA.

18– DO CALCULATIONS ON RIGHT-SHOULDER DATA
      1) FIND THE # OF LUGS
      2) LUG AVERAGING ROUTINE (1 VALUE/LUG)
      3) FIND LOW LUG VALUE
      4) MEASURE RUN-OUT AND VERIFY
      5) FLAT SPOT CHECKING

19– UNLOCK/MOVE LASER TO LEFT-SHOULDER PT., PRESS BUTTON TO LOCK DOWN CARRIAGE.

20– PRESS TAKE RUNOUT MEASUREMENT PB, TIRE ROTATES AND MACHINE COLLECTS DATA.

20A– CONTINUE (NO/YES)

FIG-19B

21- DO CALCULATIONS ON <u>LEFT-TANGENT</u> DATA
   1) FIND THE # OF LUGS
   2) LUG AVERAGING ROUTINE (1 VALUE/LUG)
   3) FIND LOW LUG VALUE
   4) MEASURE RUN-OUT AND VERIFY
   5) FLAT SPOT CHECKING

22- MOVE LASER BACK AND OUT TO HOME SAFE POSITION.

23- DO CALCULATIONS ON <u>LEFT-SHOULDER</u> DATA
   1) FIND THE # OF LUGS
   2) LUG AVERAGING ROUTINE (1 VALUE/LUG)
   3) FIND LOW LUG VALUE
   4) MEASURE RUN-OUT AND VERIFY
   5) FLAT SPOT CHECKING

24- DO THE FOLLOWING CALCULATIONS
   1) CREATE THE VIRTUAL TEMPLATE
   2) CONICITY CHECK
   3) FIND TIR

25- IS TIRE A CANDIDATE FOR TRUING? (NO/YES).

25A- OVERRIDE TO MAKE 2 CUTS (NO/YES).

25B- ADJUST VIRTUAL TEMPLATE.

26- MOVE THE TRUER CARRIAGE TO MOLD SPLIT LINE AND LOCK.

27- TRUER WILL MAKE FIRST PASS AND CUT TO VIRTUAL TEMPLATE.

28- WANT TO MAKE ANOTHER PASS? (NO/YES).

29- ENTER THE DEPTH OF THE FOLLOWING CUT AND PRESS BUTTON TO INITIALIZE CYCLE.

30- TRUER WILL MAKE PASS AND CUT TO ADJUSTED PROFILE.

FIG-19C

31– UNLOCK THE TRUER STAND AND MOVE IT BACK TO THE HOME POSITION.

32– MOVE LASER TO MOLD SPLIT LINE, ADJUST W/VERNIER, PRESS BUTTON TO LOCK DOWN CARRIAGE.

33– ADJUST LASER Y-AXIS INTO POSITION FOR NEXT SIZE DIAMETER TIRE.

34– PRESS BUTTON TO ASSIGN LASER HOME, RESET LASER ENCODER.

34A– IS MOLD SPLIT AT CENTERLINE.

34B– MOVE CARRIAGE TO CORRECT POSITION.

35– PRESS TAKE RUNOUT MEASUREMENT PB, TIRE ROTATES AND MACHINE COLLECTS DATA.

36– DO THE FOLLOWING CALCULATIONS ON DATA
    1) FIND THE # OF LUGS
    2) LUG AVERAGING ROUTINE (1 VALUE/LUG)
    3) FIND LOW LUG VALUE, HIGH LUG
    4) MEASURE RUN-OUT AND VERIFY
    5) RADIAL RUN-OUT TEST (5 HARMONICS)

37– MOVE LASER BACK AND OUT TO HOME SAFE POSITION

38– PLACE PROPER MARKINGS ON THE TIRE THEN UN-CHUCK THE TIRE

39– MOVE THE TIRE TO THE PROPER LOCATION FOR DISTRIBUTION THEN CONTINUE

40– DOES THE TIRE PASS AND NOT NEED TRUING? (NO/YES)

40A– OVERRIDE FORCE TRUING ON A TIRE THAT PASSES WITHOUT TRUING? (NO/YES)

41– PLACE PROPER MARKINGS ON THE TIRE THEN UN-CHUCK THE TIRE

FIG-19D

42— MOVE THE TIRE TO THE PROPER LOCATION FOR DISTRIBUTION THEN CONTINUE

43— DO YOU WANT TO RE-CHUCK THE TIRE? (NO/YES)

44— MOVE LASER BACK TO THE HOME POSITION AND RE-CHUCK THE TIRE

45— DISCARD TIRE APPROPRIATELY AND LOCATE NEW TIRE

46— DO YOU WANT TO RE-CHUCK THE TIRE? (NO/YES)

47— MOVE LASER BACK TO THE HOME POSITION AND RE-CHUCK THE TIRE

48— DISCARD TIRE APPROPRIATELY AND LOCATE NEW TIRE

FIG-19E

METHOD AND APPARATUS FOR CORRECTING TIRE NONUNIFORMITY

FIELD OF THE INVENTION

The present invention relates to a method and apparatus for correcting tire nonuniformities, more particularly for correcting for radial runout conditions in tires.

BACKGROUND OF THE INVENTION

In large off the road tires, such as are used in construction or agriculture, the treads are formed of large tread elements often described as lugs or bars. In the manufacture of such tires the outside diameter or peripheral surface of the tread often times is not uniform within a circumferential plane relative to the distance as measured from the tire's axis of rotation. Assuming a tire was mounted onto a rim and the rim was perfectly centered on an axis of rotation, then a perfectly molded tire should have a constant radial distance measured from the axis to any location on the outer peripheral surface within any circumferential plane perpendicular to the tires axis. Unfortunately, the method of manufacturing tires results in many non-uniformities such that the radial distance from a tread elements outer surface can vary widely. In large tires this condition is commonly referred to as radial runout. Radial Runout creates a first harmonic vibration as the tire rotates. This results in harsh lug impacts that vibrate the vehicle and the driver. Correcting this problem can dramatically eliminate almost all of the first harmonic vibrations.

In U.S. Pat. No. 6,237,402 the problem was addressed by finding a high spot on the tire and then shifting a rim disk relative to the rim toward the location of the maximum radial runout by a distance half the amount, thereby minimizing the amount of runout. This prior art method while being a great field expedient did not truly correct the tires condition but simply masked the problem. The tires runout conditions are not limited to one high spot and one low spot across the entire tread width. In U.S. Pat. No. 6,237,402 the equatorial center plane in the crown of the tire was the only circumferential plane measured. The movement of the rim disk quite frankly could only address one worst-case condition at a time. Accordingly the best that could be achieved was a minimizing of the problem.

In a more complex analysis of the tires tread profile it is well known that variations in the tire profile can occur anywhere between the tread shoulders. Accordingly the tires entire lateral profile should be considered when looking for radial runout conditions.

Wada, et al in U.S. Pat. No. 5,485,406 describes an apparatus and a method for detecting the tread profile of a tire mounted about an X axis comprising a non contact Y detection means movable parallel to the X axis for measuring the distance at a right angle between such means and the peripheral surface of the tread. The method is applied to the measurement of a profile of a tire when the X and Y data are divided into groups for the crown and shoulder portions of the tire respectively. The method also includes computation of radial runout of the tire using regular rotation position data output corresponding to particular X and Y values for rotation of the tire.

While Wada appreciates the problem of measuring a test tire for the profile of the tread, this has little useful value if corrective measures are not taken. In small tires such as passenger or light truck tires subtle design changes can be made to minimize runout. In some cases tires can be force grinded to take down high spots.

In large tires such as agricultural tires the use of force grinding can be used, however, the appearance is usually very noticeable. Secondarily, the amount of material that needs to be grinded is substantially larger than is commonly required in smaller tires. This can be time consuming but more importantly the rubber dust created in grinding operations requires more sophisticated material handling and removal systems.

It is an object of the present invention to provide a reliable way to inspect a tire, even a large agricultural or off-road tire, for radial runout.

It is a further object of the present invention to correct for the runout condition in a fast and reliable manner while minimizing the amount of tread rubber that is required to be removed.

It is a further object of the invention to provide a like new polished rubber finish on the tire after correcting for radial runout.

SUMMARY OF THE INVENTION

A method of correcting the radial runout variation across the peripheral surface of tread elements of a tire is disclosed.

The method has the steps of locating the tires center axis; locating and measuring the radial high point and radial low point on the treads peripheral surface in each of several circumferential planes located between the tread shoulders; inputting the measurements into a computer and comparing the compilation of measurements to stored tread profile algorithms, selecting or creating the optimum profile algorithm for establishing a virtual tread profile template; and engaging a tread removal means to remove tread rubber to match the tread profile to the virtual tread profile template.

In a preferred and more sophisticated method the step of comparing the compilation of measurements to stored tread profile algorithms can be replaced by using a predetermined set of rules which the computer software can apply to create an optimal tread profile. This technique employs artificial intelligence software that enables the computer to generate an optimal tread profile creating the virtual template rather than simply selecting a best fit from a canned or stored profile. As a result of the ability to adjust from a bad or non-uniform profile to an optimal profile the tire's ride performance is greatly improved. The software enables a custom profile to be created from an infinite number of combinations.

The method is best performed when the measurements are taken in at least three circumferential planes, in large diameter tires more preferably in at least five separate circumferential planes.

The movement of the tread removal means is controlled by directing the movements to follow the virtual template. For ease of apparatus construction the rotational movement of the tire is performed and controlled as the tread removal means traverses across the tread to form the profile.

The above method is best performed by employing an apparatus having a laser profile measuring device mounted on a movable carriage and truing device assembly mounted on a movable carriage assembly. Each carriage is guided by a pair of linear bearing rails in the X direction of movement. The apparatus further includes a tire rotation device which rotates the tire for both profile measuring and truing.

DEFINITIONS

For ease of understanding this disclosure the following terms are disclosed:

"Aspect Ratio" means the ratio of the tire's section height to its section width.

"Axial" and "axially" means the lines or directions that are parallel to the axis of rotation of the tire.

"Bounce" or "Hop" means the vertical acceleration related to first Harmonic Radial Runout or Force Variation of each tire and rim assembly interacting with the other tire and rim assemblies of the vehicle.

"Circumferential" means lines or directions extending along the perimeter of the surface of the annular tire parallel to the equatorial plane EP and perpendicular to the axial direction.

"Design Rim" means a rim having a specified configuration and width. For the purposes of this specification, the design rim and design rim width are as specified by the industry standards in effect in the location in which the tire is made. For example, in the United States, the design rims are as specified by the Tire and Rim Association. In Europe, the rims are as specified in the European Tyre and Rim Technical Organization—Standards Manual and the term design rim means the same as the standard measurement rims. In Japan, the standard organization is The Japan Automobile Tire Manufacturer's Association.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Inner" means toward the inside (air side) of the tire and "outer" means toward its exterior (road side).

"Lateral Edge" means the axially outermost edge of the tread as defined by a plane parallel to the equatorial plane and intersecting the outer ends of the axially outermost traction lugs at the radial height of the inner tread surface.

"Leading" refers to a portion or part of the tread that contacts the ground first, with respect to a series of such parts or portions, during rotation of the tire in the normal direction of travel.

"Lope" means once per revolution fore & aft acceleration/deceleration related to first harmonic radial runout or force variation of tire and rim assembly.

"Net-to-gross Ratio" means the ratio of the surface area of the normally loaded and normally inflated tire tread rubber that makes contact with a hard flat surface, divided by the area of the tread, including no contacting portions such as grooves as measured around the entire circumference of the tire.

"Normal Inflation Pressure" means the specific design inflation pressure assigned by the appropriate standard organization for the service condition for the tire.

"Normal Load" means the load assigned by the appropriate standards organization for the service condition for the tire when inflated to the normal inflation pressure.

"Radial" and "radially" mean directions radially toward or away from the axis of rotation of the tire.

"Shake" means higher frequency lug induced vibrations felt in the cab or steering wheel or seen in movement of the exhaust stack (no particular acceleration).

"Shudder" means a lug induced vibration at low frequency, resulting in a vertical acceleration felt through the floor of the cab.

"Trailing" refers to a portion or part of the tread that contacts the ground last, with respect to a series of such parts or portions during rotation of the tire in the preferred direction of travel.

"Tramp" means side-to-side motion, or lateral acceleration, induced by first harmonic radial runout or force variations of each tire and rim assembly interacting with each other.

"Tread Arc Width" (TAW) means the width of an arc having its center located on the equatorial plane (EP) and which substantially coincides with the radially outermost surfaces of the various traction elements (lugs, blocks, buttons, ribs, etc.) across the lateral or axial width of the tread portions of a tire when the tire is mounted upon its designated rim and inflated to its specified inflation pressure but not subject to any load.

"Unit Tread Pressure" means the radial load borne per unit area (square centimeter or square inch) of the tread surface when that area is in the footprint of the normally inflated and normally loaded tire.

"Vibration Ratings" means the subjective ride terminology wherein "slight" means barely noticeable; "moderate" means noticeable but not objectionable; "severe" means objectionable.

BRIEF DESCRIPTION OF THE DRAWINGS

The invention will be described by way of example and with reference to the accompanying drawings in which:

FIGS. 19A through 19E represent the actual steps identified by number in the schematic of FIG. 18;

DETAILED DESCRIPTION OF THE INVENTION

Figure 1:
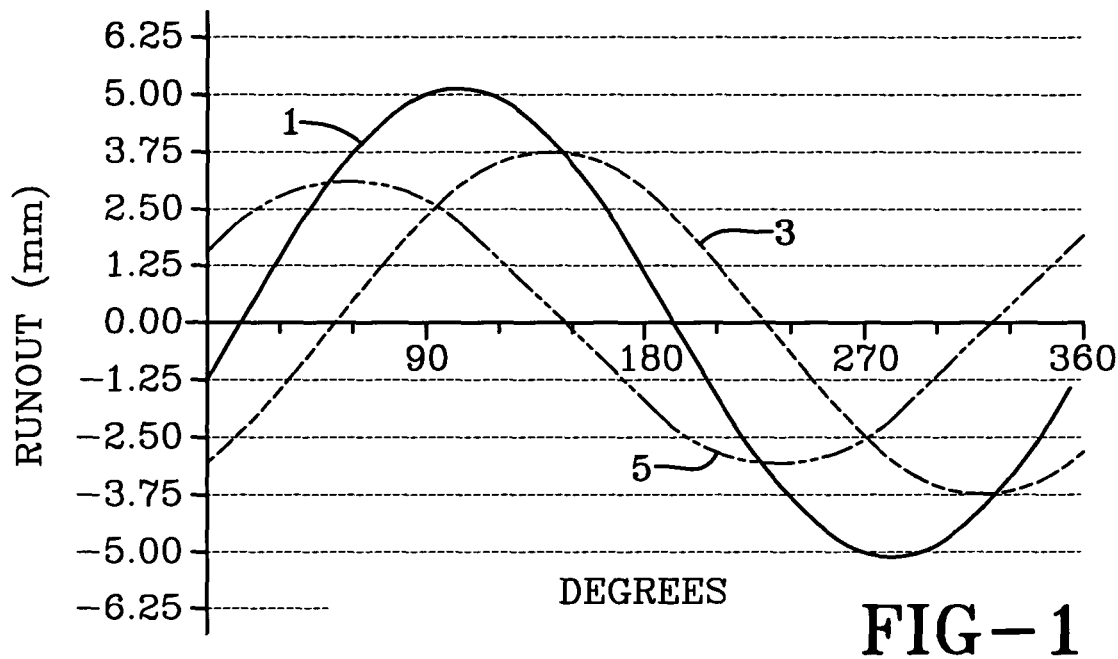
FIG. 1 shows a chart of the typical radial runout first harmonic with the tire and rim in their initial positions at 0.degree; one full rotation of 360° represents the entire profile.

FIG. 1 shows the radial runout first harmonic measured in mm of an agricultural tire 10 and rim 12 assembly 14. The bold line 1 showing the assembly's radial runout, the dashed line 3 showing the rim 12 radial runout and the dotted line 5 showing the tire radial runout. The initial position is at 0 degree, and traverses the entire 360 degree around the assembly. For the purposes of this invention, the first harmonic represents the runout condition that is characterized by one high point and one low point. In other words, an out-of-round situation with one high point and one low point in each revolution.

Figure 2:
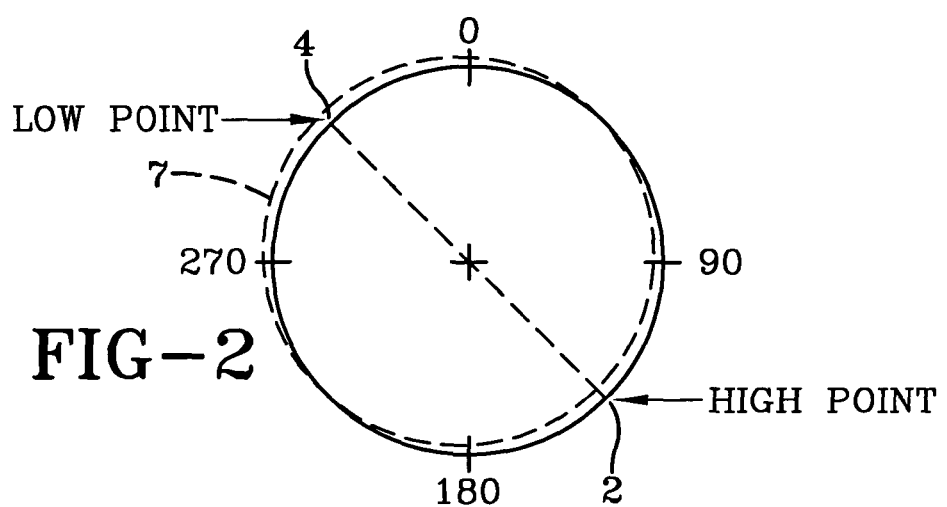
FIG. 2 shows the radial runout first harmonic for a perfect out-of-round condition where the tire rotates about an axis that is slightly off center.

Shown in FIG. 2, is the radial runout first harmonic for a perfectly round condition where the tire rotates about an axis that is slightly off center. As shown in FIG. 2, the high point 2 being shifted off of the true oval center or circular center line 7 and the low point 4 being shifted radially inward of the true circular center line.

The first harmonic high point, low point condition of the tire and rim assembly 14 results in the tire 10 transmitting a harsh vibration to the driver of the vehicle. From past experience, the inventor has determined that the most important harmonic (for speeds up to 42 km/h) is the first harmonic. This first harmonic is felt as a once-per-revolution bounce or lope. If the bounce or lope is bad enough, serious driver jostling in the cab can occur. A vast majority of the ride and handling problems associated in agricultural tires results from this first harmonic radial runout condition.

Figure 3:
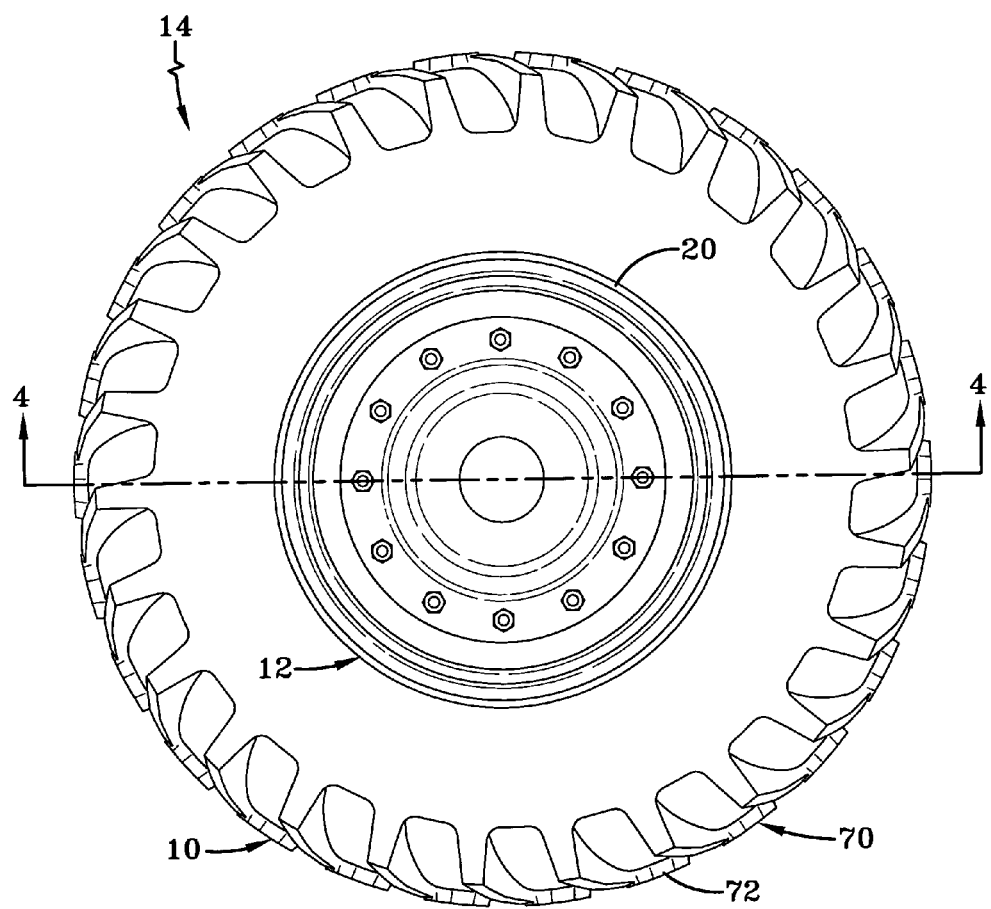
FIG. 3 is a plan view of an exemplary tire and rim assembly.
Figure 4:
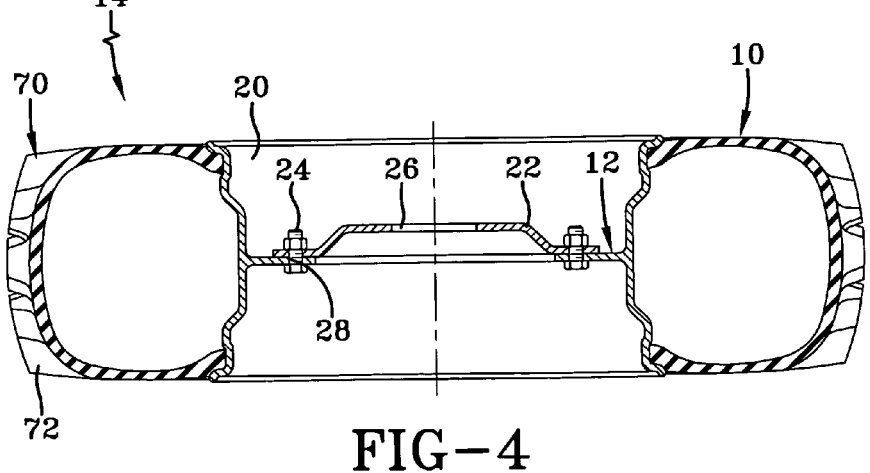
FIG. 4 is a cross-sectional view of the exemplary tire and rim assembly of FIG. 3 taken along lines 4—4.
Figure 5:
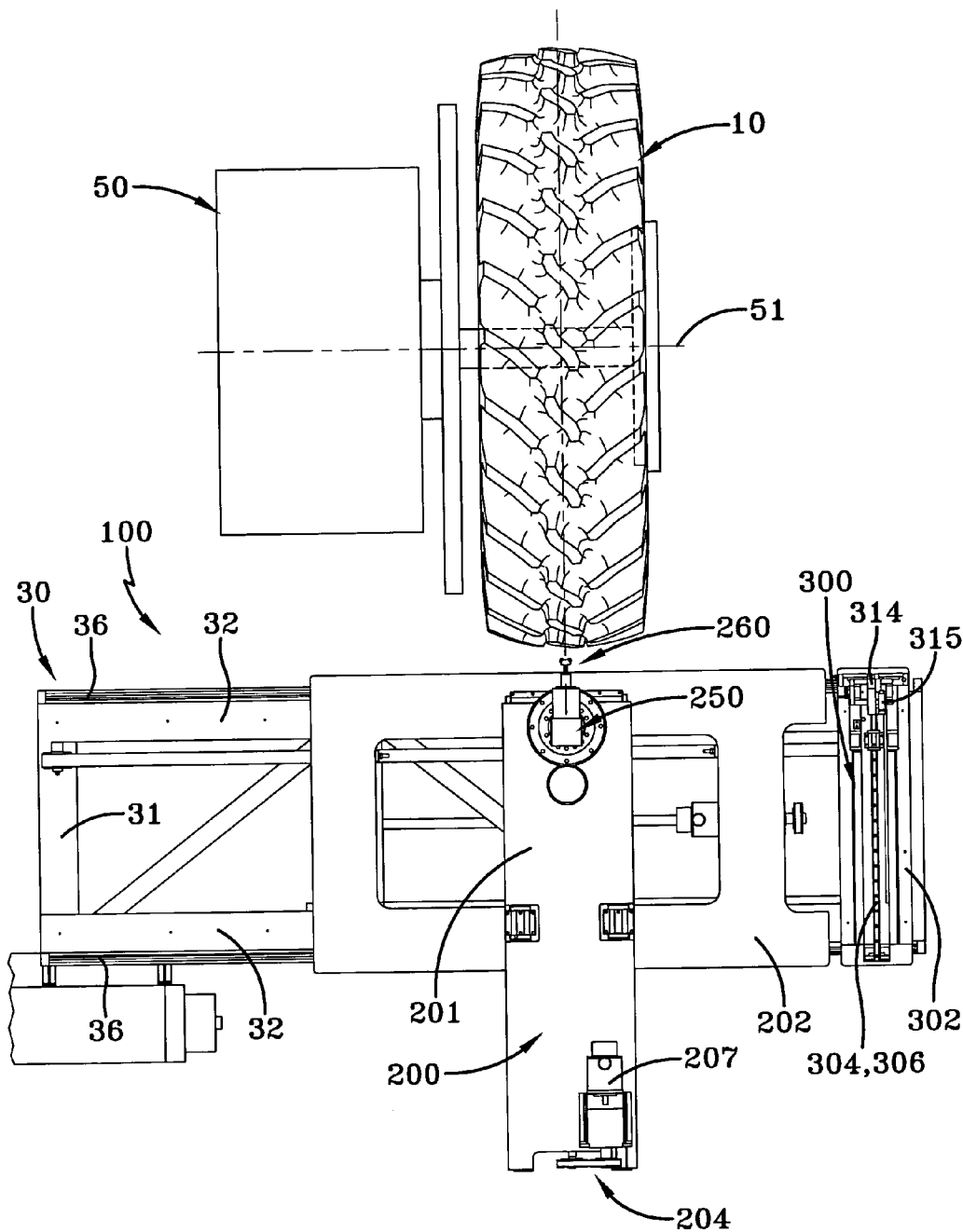
FIG. 5 is a top view of a preferred apparatus for locating, measuring and correcting the radial runout of the tire and rim assembly and a tire aligned with the truer cutter assembly.
Figure 6:
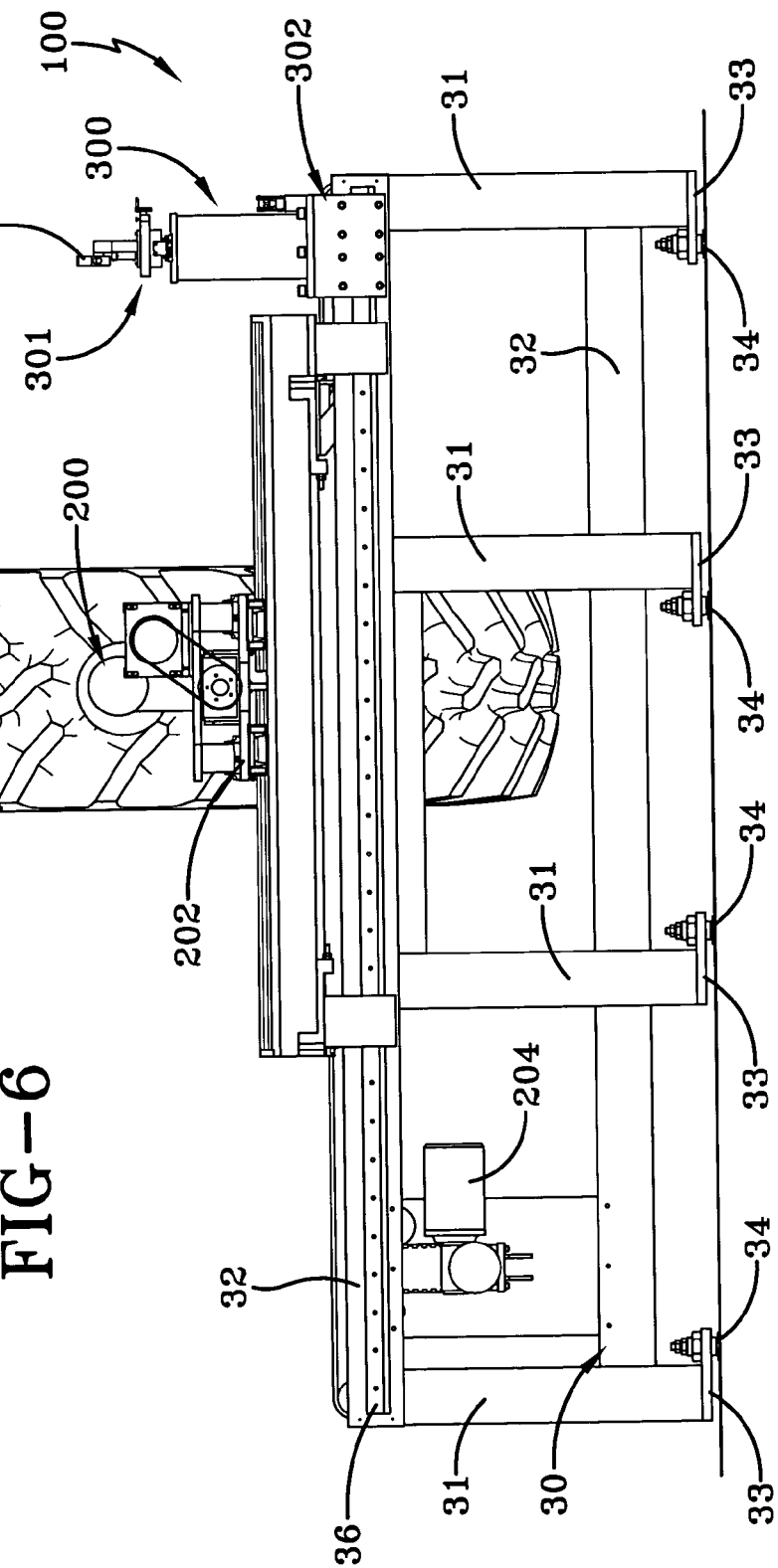
FIG. 6 is a plan or front view of the apparatus of FIG. 5 with the outer surface of the tire 14 aligned with the truer cutter assembly.
Figure 7:
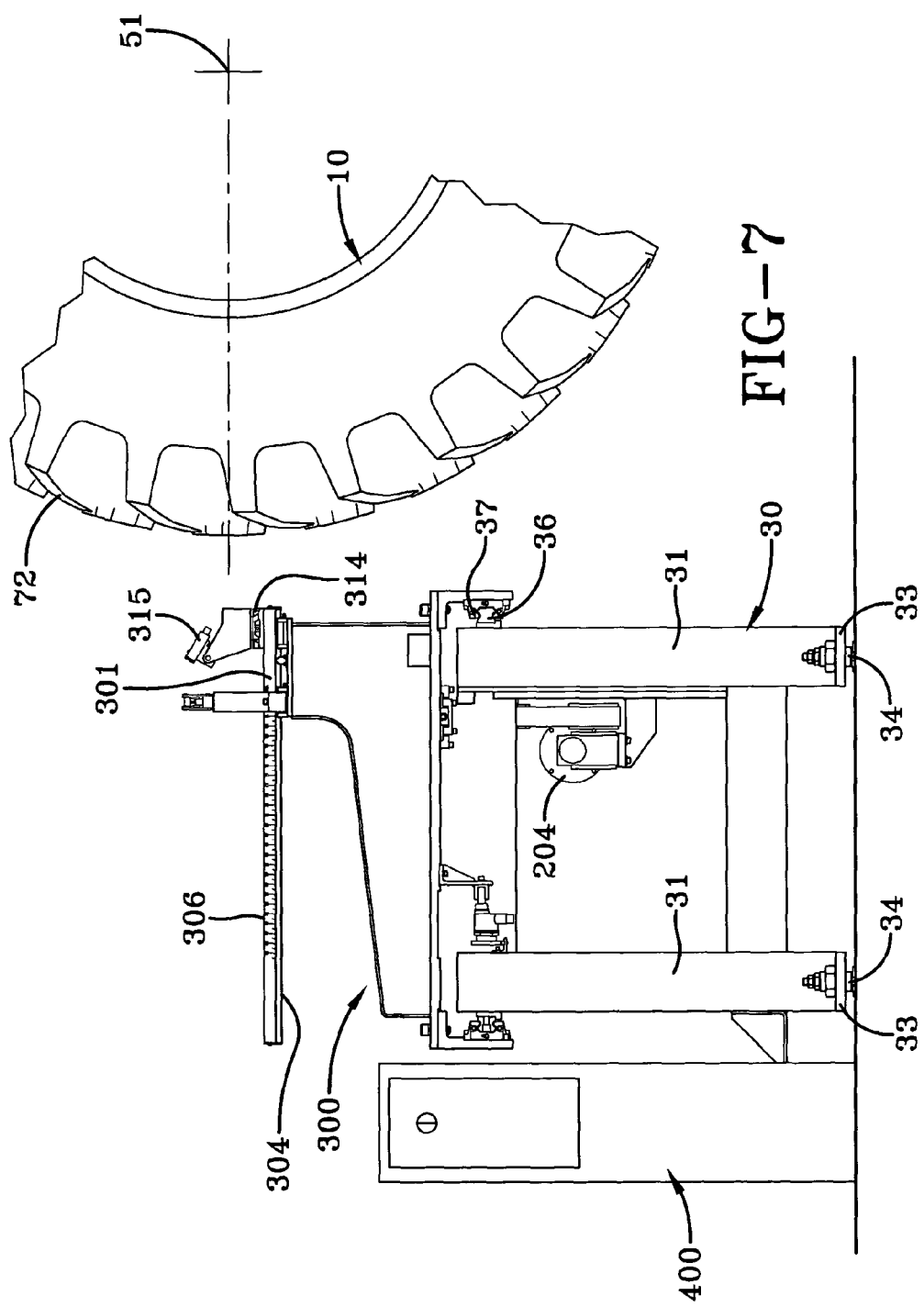
FIG. 7 is a partial side view of the tire and rim assembly aligned with the laser-profiling device.
Figure 8:
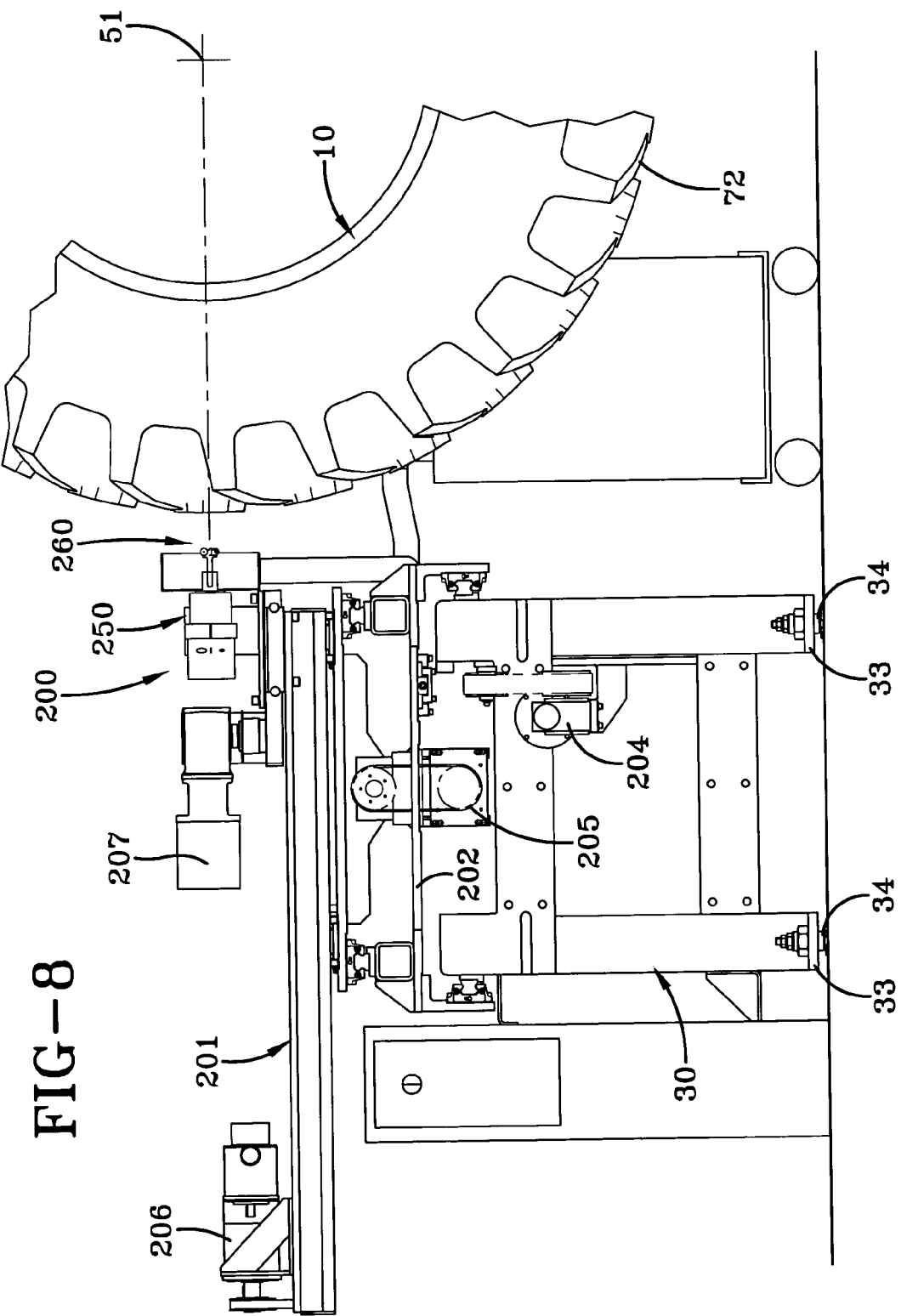
FIG. 8 is a partial side view of the tire and rim assembly aligned with the truer cutter assembly.

As shown in FIGS. 3 and 4, and agricultural tire 10 is mounted to a rim 12 forming an assembly 14. The tire rim assembly 14 has a tire 10 having an annular tread 70. The tread 70 has a plurality of tread lugs 72. The rim 12 has two primary components: a radially outer annular ring or rim 20 to which the tire 10 is mounted and a radially inner central disk 22. The central disk 22 mounts over the axle of the vehicle and is bolted by means of threaded fasteners 24 to the annular outer ring or rim 20 thereby making a completed assembly 14. With further reference to the cross-sectional view of FIG. 4, it can be seen that the threaded fasteners 24 securely fasten the disk 22 to the rim 20. This plurality of threaded fasteners 24 pass through clearance holes 28 in both the rim and disk. The clearance holes 28 must be of sufficient size to permit the rim 20 and disk 22 to be attached easily. These clearance holes 28 can provide a displacement of the disk 22 relative to the rim 20 by as much as 5 mm in any one direction. Historically, this displacement could cause a misalignment of the axis of rotation of the rim assembly 14 relative to the drive axle of the vehicle due to a shifting of the hub clearance hole 26 of the disk 22.

While the rim assembly 14 can contribute to radial runout, the present invention is directed to correcting tire nonuniformities and the ability to true large tires independent of the rim assembly.

In reference to FIGS. 5 through 12, the semi-automatic tire measuring and truing apparatus 100 consists of a ridged base 30 which forms the foundation for all of the machine elements. The base 30 runs the entire length of the machine 100 and provides machine mounting surfaces for one truing device carriage 202, one laser profiling carriage 302, and the entire electrical control system 400.

The base 30 is a weldment made of large square steel tubing members 31, 32 for maximum strength, stability, and minimal vibration transmission. The base 30 is preferably made in two sections for fabrication and shipping efficiency. The two sections are aligned with machined key ways and bolted together to assure ease of initial assembly. Elimination of long-term machine drift and a good frame of reference for supporting all of the machine elements is essential. The machine pads 33 on the base 30 ensure that each subassembly is in the proper place and oriented to function as intended. Leveling screws 34 are integrated into the base 30 to accelerate installation. The base 30 is designed to accommodate one truer 200 and one or more measuring devices 300. As shown, the machine 100 has one measuring device 300 illustrated. It is understood, however, that the truer device 200 can work with two measuring devices 300 and one truer device 200.

Figure 9:
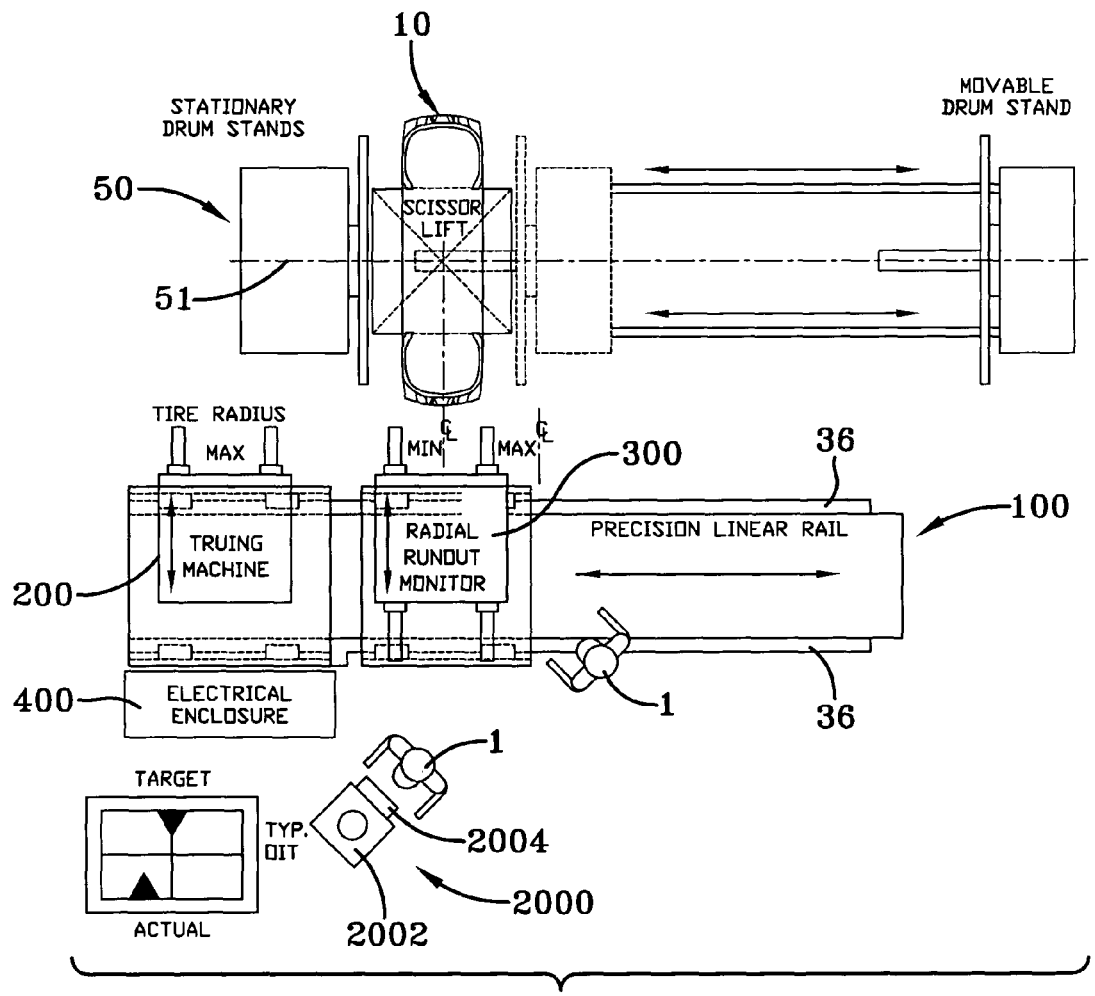
FIG. 9 is a top view of the entire apparatus with a tire assembled to the scisser lift mechanism.
Figure 10:
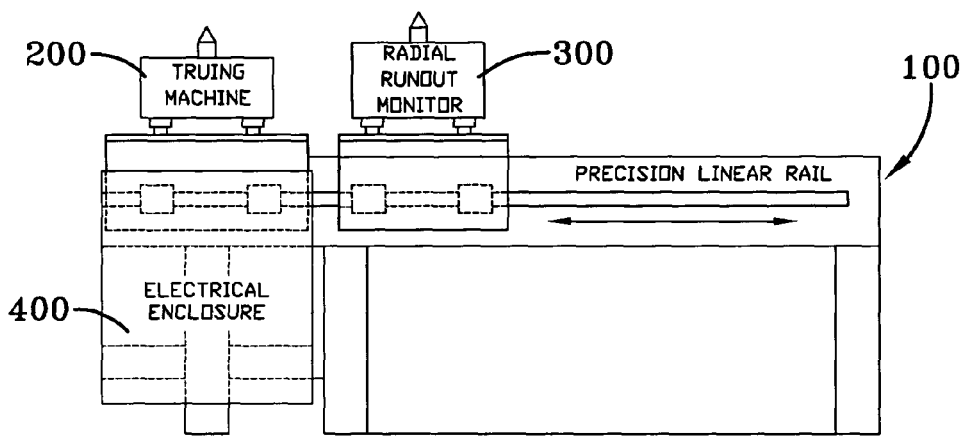
FIG. 10 is a frontal view of the apparatus.

The base 30 has linear bearing rails 36 and bearing blocks 37 for the truer device 200 and measuring devices 300 to travel in the direction parallel to the drum shaft axis 51 of the tire 10 to be trued. Throughout this specification this direction parallel to the drum shaft axis 51 is referred to as the X direction. Steps are provided with the base 30 so that the operator 1 can climb onto the steps to observe and monitor the truing process as it is occurring as shown in FIG. 9. The ridged base 30 and the accurate mounting of the linear bearing rails 36 are two keys to begin the high quality design and fabrication of the system. These mounting rails 36 are designed with tolerances of a few thousands of an inch across the entire length of the frame. This ensures that the profile measurements and cutting action are accurate to within a very high degree of reliability.

Figure 12:
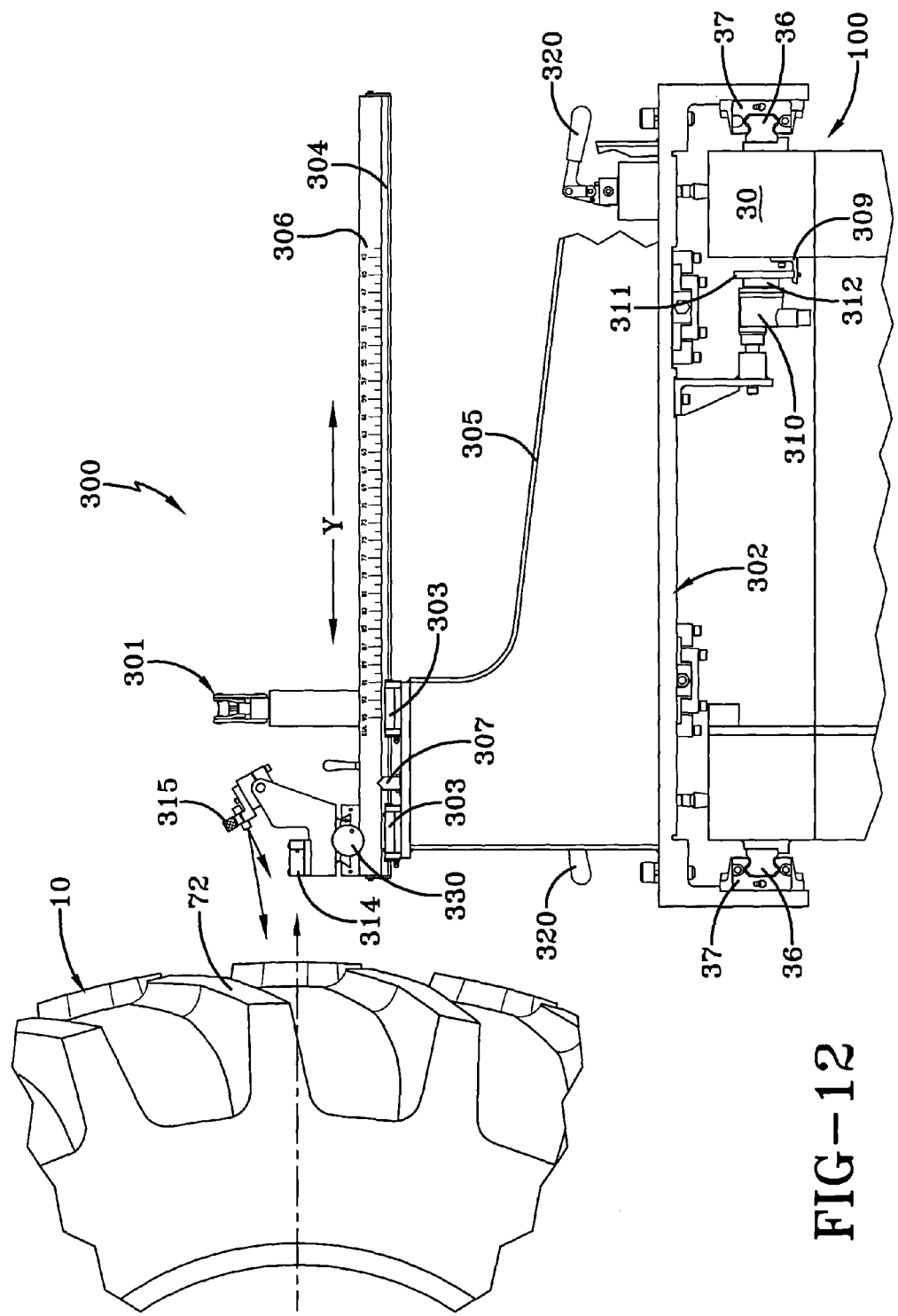
FIG. 12 is a partial side view of the measurement apparatus.
Figure 13A:
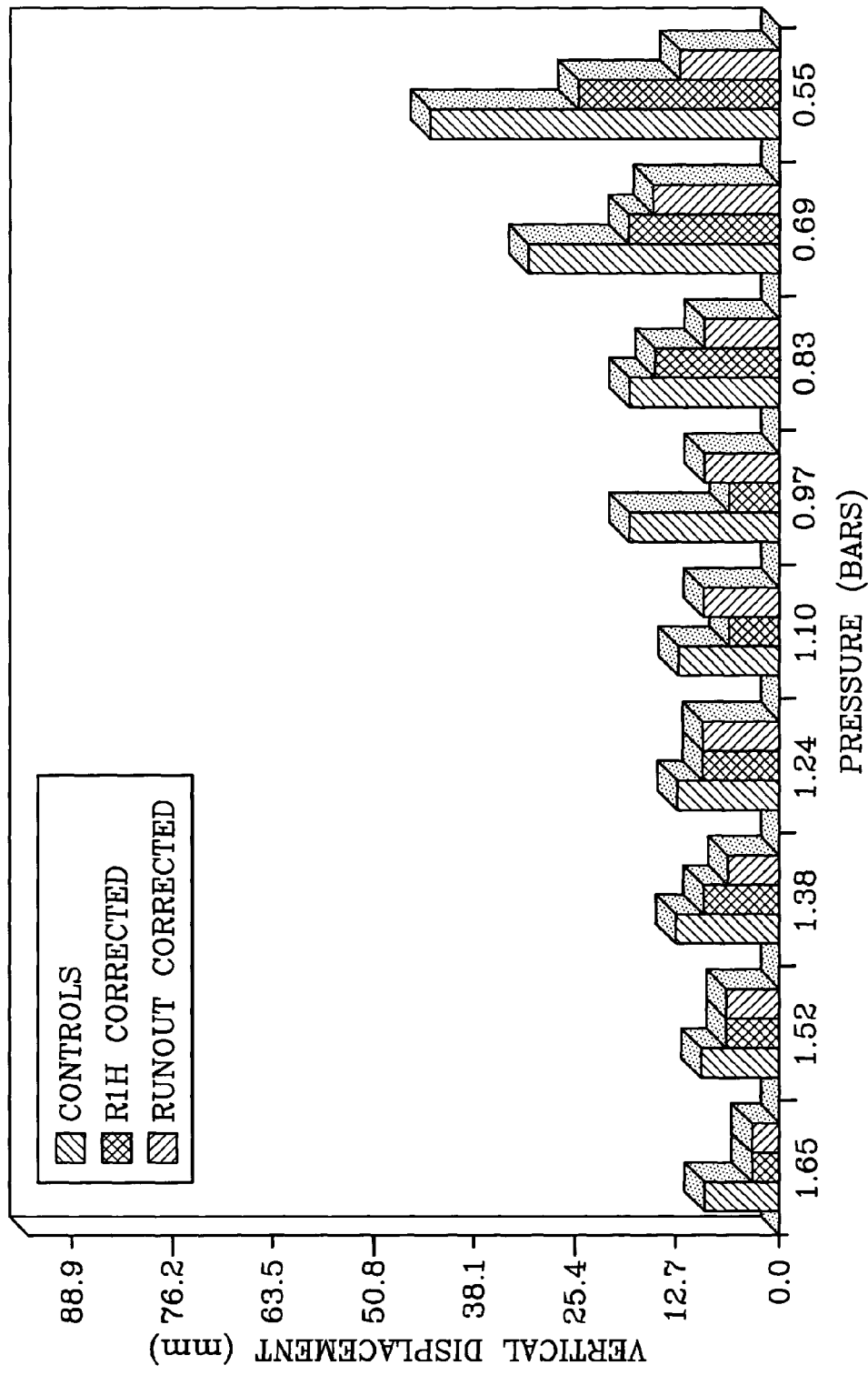
FIGS. 13A, 13B and 13C depict three charts which show the approximate vertical displacement of the axle at various tire inflation pressures for speeds of 32 km/m, 35 km/h and 42 km/h reading left to right, the first bar being the tire wheel assembly prior to correcting the radial runout, the second bar representing a first harmonic corrective procedure, the third bar representing the simplified inventive method to correct the runout.
Figure 13B:
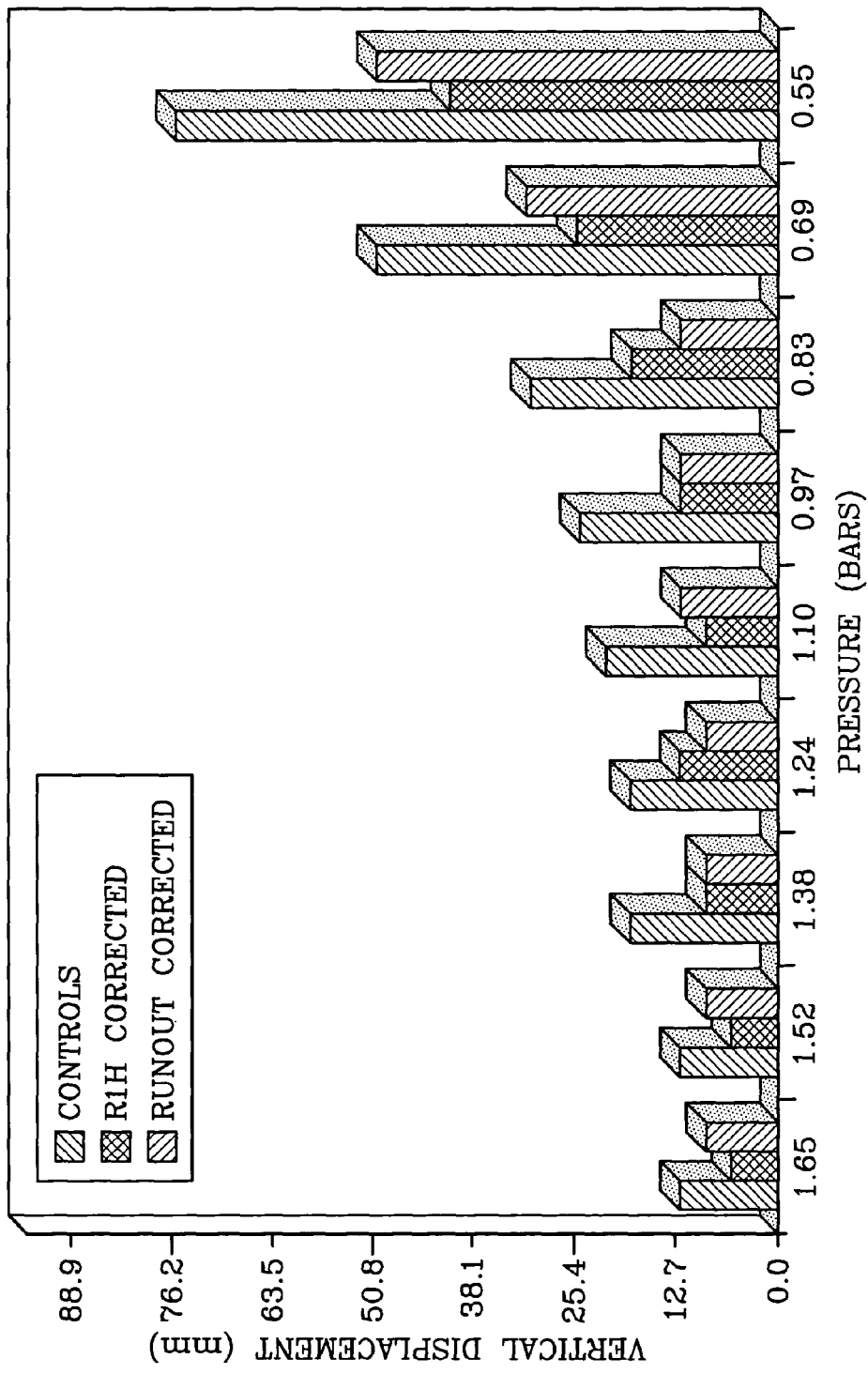
Figure 13C:
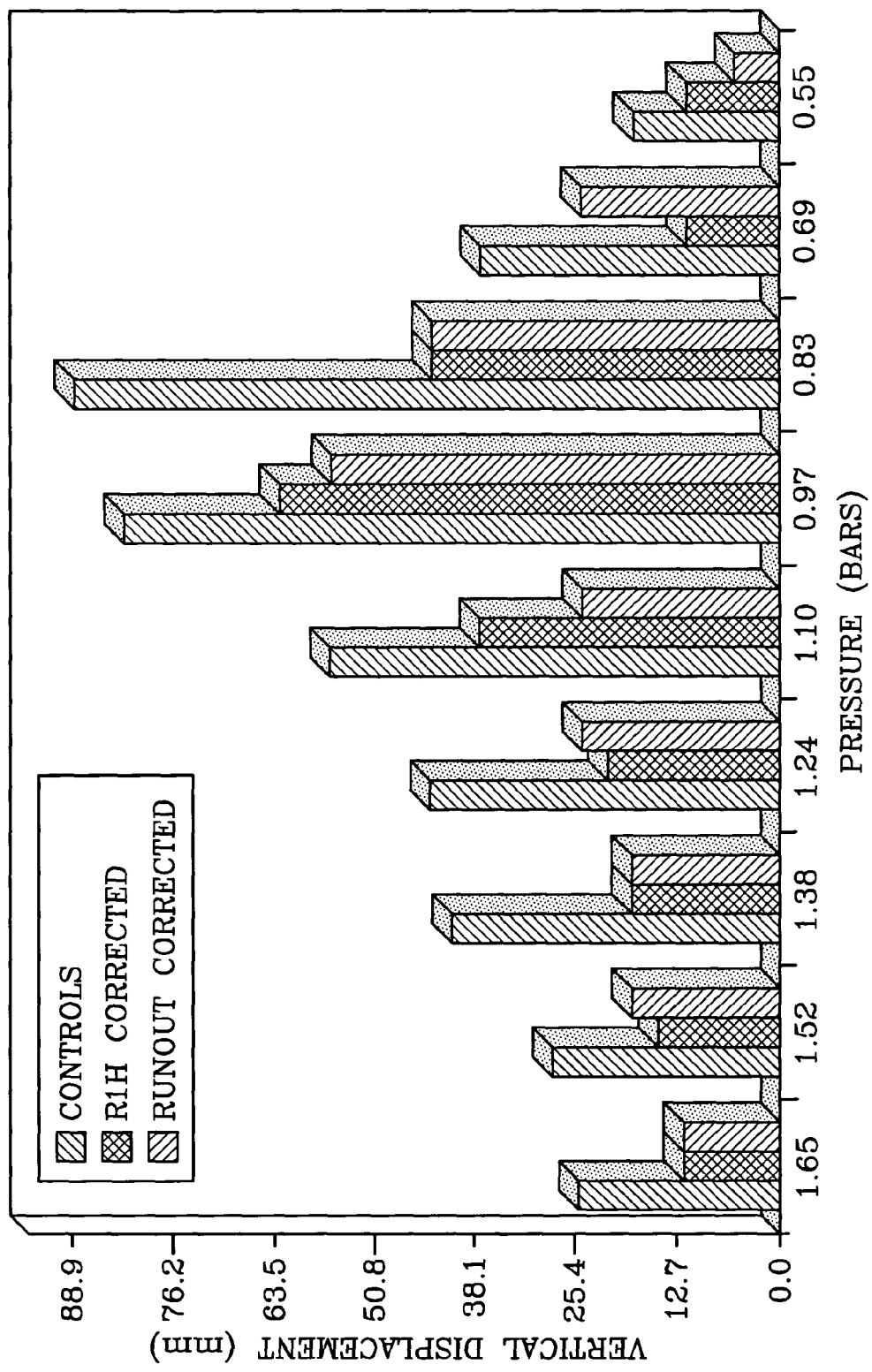

The first subassembly or system that will be discussed in this application will be the laser-profiling device 300. This laser-profiling device 300 includes a carriage 302. The laser profiling carriage 302 travels in the X direction on the precision linear bearings 37. The linear bearing rails 36 are mounted to the base 30 with a high level of accuracy as was previously discussed. As shown in FIG. 12, the top of laser profiling carriage 301 travels in the Y direction perpendicular to the tire holding axis 51 via the precision linear bearings 303 and bearing rail 304. The linear bearings 303 are mounted to the profiling carriage weldment 305. The laser profiling carriage weldment 305 is a robust steel construction designed for strength and rigidity. An encoder 310 is mounted to the underside of the laser profiling carriage 302. A spur gear 311 is mounted to the end coder shaft 312 which engages a stationary gear rack 309 mounted to the base 30. This advises the electronic position location of the laser profiling carriage 302 in the X direction and ensures that the exact location of the carriage 302 is known at all times. As shown in FIG. 12, a reverse engraved plastic laminate scale 306 and pointer 307 are attached to the Y-axis to advise position visibility of the laser profiling carriage 302 in this plane of motion. The laser profiling carriage 302 is manually moved in both the X and Y directions by the operator 1. The pushing or pulling force is only few pounds due to the low friction of the precision linear bearings 37. Manually activated toggle locks 320 are used to maintain the laser profiling carriage 302 position after movement by the operator 1. Mountings are provided for both the measuring laser sensor 314 and the laser centerline light 315. A manual micro adjustment light assembly 330 is provided to move both measuring laser sensor 314 and the laser centerline light 315 in small increments for precise positioning of the tire 10. Provision has been made in the design of the system so that a second and identical laser profiling device 300 can be added to the opposite end of the base 300. This enables this system to be expanded to a process where two tires 10 can be worked on simultaneously one tire being measured while the second tire is being trued.

With reference to the truing device assembly 200, we refer to FIGS. 5, 6, 8, 9, 10 and 11 again. The truing device assembly 200 consists of an X-axis direction-traversing sled 202 for gross movements. The sled 202 travels in the X direction on the precision linear bearings 37 attached to the linear bearing rails 36. The linear bearing rails 36 are mounted to the base 30 as discussed in the previous paragraphs. This provides for the gross movement of the assembly 200 to move from a side position to the tire centerline position. Movement is provided by a gear motor/sprocket/timing drive belt combination 204. The following equipment is mounted on the X direction-traversing sled 202, a two-axis X-Y direction carriage assembly 201 which supports the truer cutter. Both X and Y axis are servo motor driven for accurate movements of the truer cutter, a Z movable truer cutter assembly 250 with special cutting tool holder 251 and multiple cutter blades 252, and a truer cutter Z axis pivot system with Z axis motor 207 and pivot gear 208 for maintaining the truer cutter blades 252 perpendicular to the tire surface, and a vacuum system (not shown) for rubber chip collection.

With reference to the system's electrical control description, the apparatus 100 illustrated has a control structure made up of two individual control systems which operate separately, however, continuously pass information back and forth. The two control systems are a GE 90/30PLC and a GE HMI Display Station 2000. They are linked via a high speed Ether Net connection. The GE 9/30PLC is an extremely powerful tool. The 364 model is a high performance CPU. It supports connection to an Ether Net network via either of two network port options. The main purpose of this system is to monitor inputs and outputs and to handle the motion control of the truing machine 200. A secondary purpose is to monitor the position of the laser profile device 300 and carriage 302 and the output of the measurement laser sensor 314.

There are five axis of motion on the truing device assembly 200. The X axis servo motor 205 and Y-axis servo motor 206 are digital servo axis. They use 20-amp beta series drive with a 0.9 KW servomotor. Both have a built in 32 k serial encoder. The tire rotation, truer carriage, and Z-axis servo motor 207 have AC induction motors with variable frequency drives. All three have built-in encoders to monitor position. All five of these axis are wired to servo axis position cards in the PLC rack.

The measurement laser sensor 314 sends an analog signal back to the PLC analog input card giving the system the distance between the laser sensor 314 and the tire 10. There is also an error signal which comes back from the measurement laser sensor 314 which tells the PLC if the measurement is out of the specified range.

The GE HMI Display Station 2000 is an industrial computer which also acts as a human machine interface (HMI). The Display Station has a 12.1-inch active matrix resistive touch screen 2002 with an integrated keypad 2004. It also has an AMDK6-2 350 megahertz, 128-megabyte ram, 6 gigabyte HD and runs Windows NT 4.0. The primary software utilized in the HMI is Cymplicity. Cymplicity is a family of supervisory monitoring and control software. The main purpose of this system is to perform the taxing mathematical calculations which are needed to determine the values of data for each tire lug 72 and in turn to create a virtual template. A secondary purpose is to store recipe information for each type of tire 10 and also to store the actual runout and truing data from each tire for up to sixty days. This information is available to other users throughout the Ether Net network and can be accessed from remote sites.

The HMI has many operator screens which will aide in the operation of the machine. A complete input/output diagnostic screen allows the operator to monitor these points without looking at the PLC. There is also a diagnostic screen for each axis of motion so the operator can determine if and when there is a problem.

The data passed back and forth from the PLC to the HMI is essential to productiveness of the truing machine 100. The PLC passes to the HMI, the raw data taken from the tire 10. The HMI will analyze this data and then create a virtual template for the particular tire. This information is then modified and sent back to the PLC in order for it to manage the motion control of the truing carriage 202. As described above, this system is capable of laser profiling the radial runout characteristics of a range of tires over multiple separate concentric zones that comprise the tread surface of the tire, and then proceed with truing each zone to a zero runout. A limit of 6 mm runout variation was used initially to determine if a tire is acceptable for truing. The truing of the zones is controlled by virtual templates that will determine the optimum tread contour for each tire that minimizes the amount of tread surface removal while resulting with a zero runout tire across the entire tread surface. The apparatus 100 consists of one X, Y, Z movable truing device 200 on an X movable truing sled 202 and a Y movable truing carriage assembly 201 with a Z movable cutter assembly 250 and one laser profiling device 300 mounted on a laser carriage 302 that travel on an X axis precision linear rail shuttle that is floor mounted and parallel to the existing tire rotation. The laser profiling carriage 302 is manually moved to the centerline of the tread surface and locked into position. The measuring laser sensor 314 is then adjusted to the proper standoff distance from the tire and locked into position. The tire 10 will then begin rotating to allow the laser sensor 314 to measure the runout characteristics of the selected zone. This procedure will be repeated for the remaining zones. Following the completion of the laser profiling of tread surface the laser profiling carriage 302 is manually returned to its standby position. If the runout data falls within the 6 mm limit, the truing carriage 202 is automatically moved into position by servo controls to the centerline of the tread surface. The entire surface of the tread is then trued per the calculated virtual profile previously determined by the laser profiler 300. A cutting tool 260 is used for actual truing of the tread surface and is capable of removing up to 6 mm of rubber in a single pass. A shop vacuum collecting system is used to contain the rubber cuttings.

When developing a tire-truing machine, the prior art conventionally used metal templates that would provide one surface on any particular tire size. This meant that large amounts of rubber had to be removed in order to ensure a zero runout condition. Furthermore, this limited the amount of radius selection to that provided by the metal template. This system is very inefficient and results in a loss of tire rubber. It was considered that if large tires or farms tires were made with just slightly additional amount of rubber it would be possible to then true the tire to the exact dimensions with a zero runout capability. This would ensure that the outside diameters are substantially the same throughout the manufacturing process, however, would allow the manufacturer to true tires in such a fashion that each customer receives a tire with minimal radial runout. Radial runout on large tires such as farm tires creates severe vibration problems that can be both distracting and annoying to the operator. The elimination of radial runout ensures that the tires first harmonic will be perfect and that the tire will run relatively smooth at operating speeds.

Figure 14:
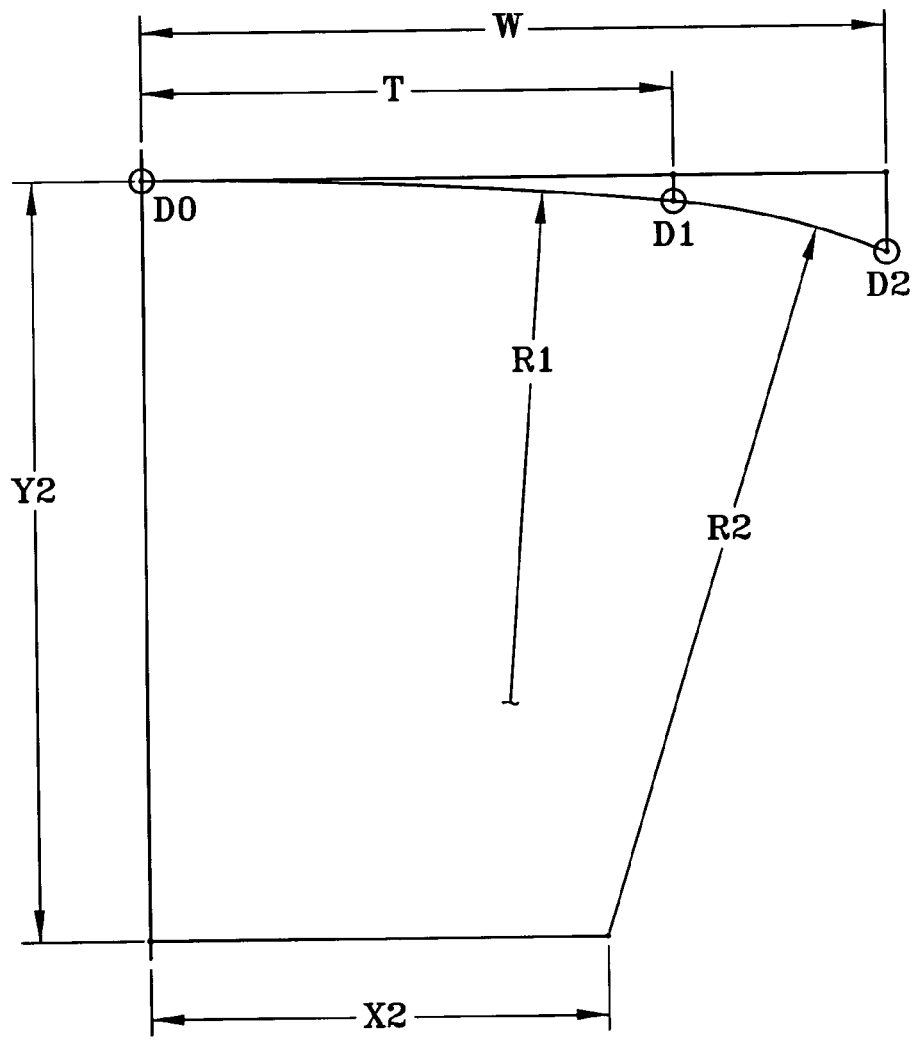
FIG. 14 is a schematic view of the tread profile measurement locations.
Figure 15:
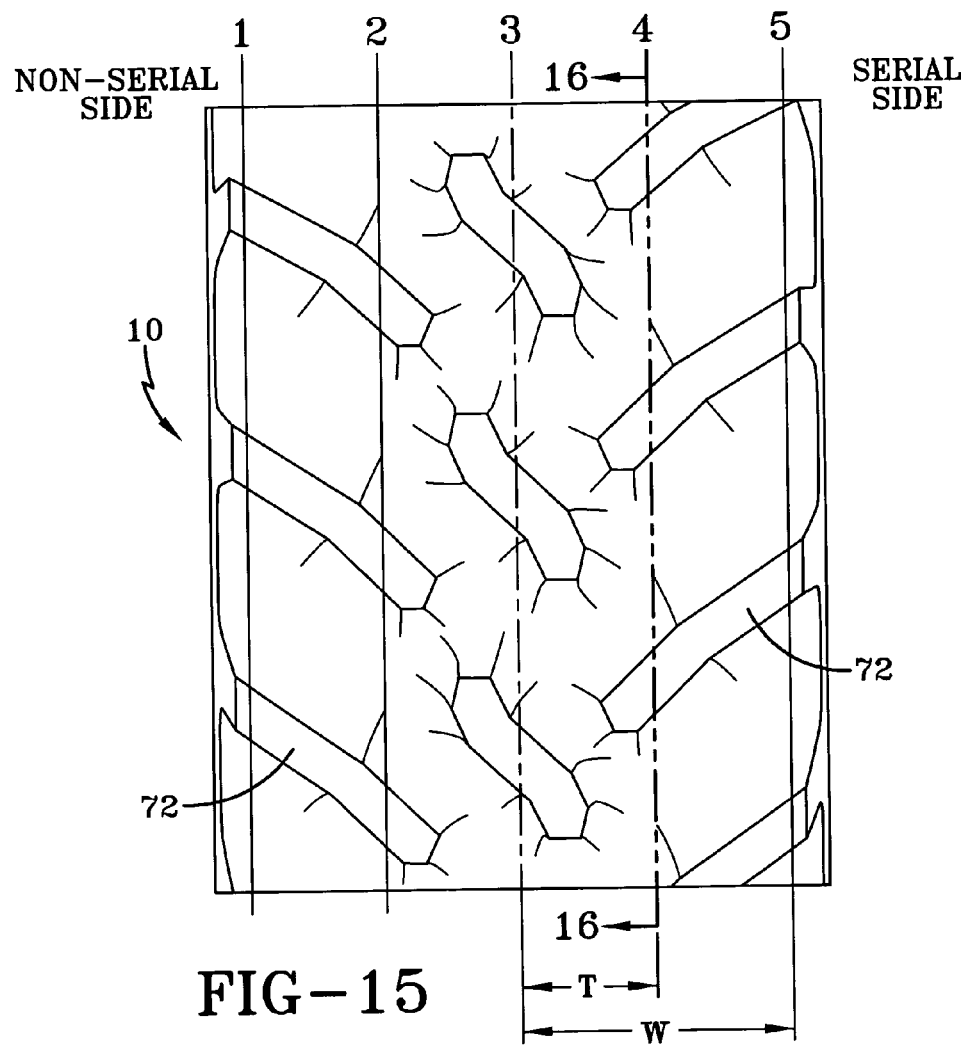
FIG. 15 shows a partial plan view of the tire divided into five circumferential planes for measurement.
Figure 16:
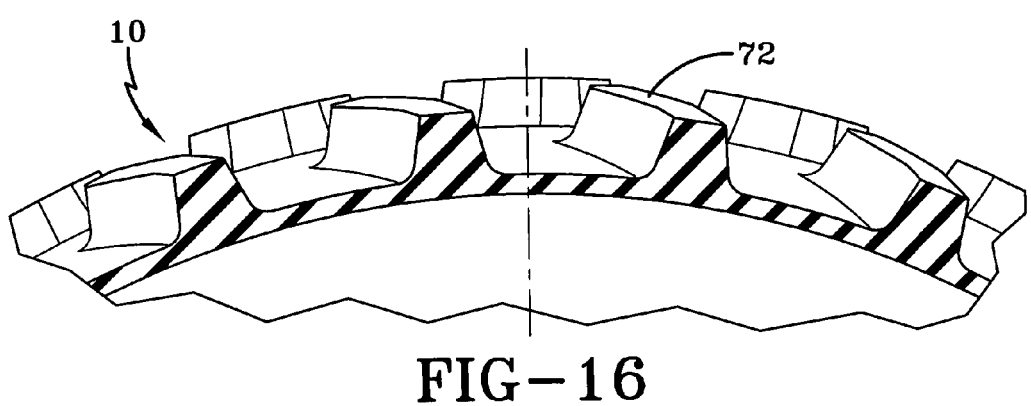
FIG. 16 is a cross sectional view taken from FIG. 16 along lines 17—17.
Figure 17:
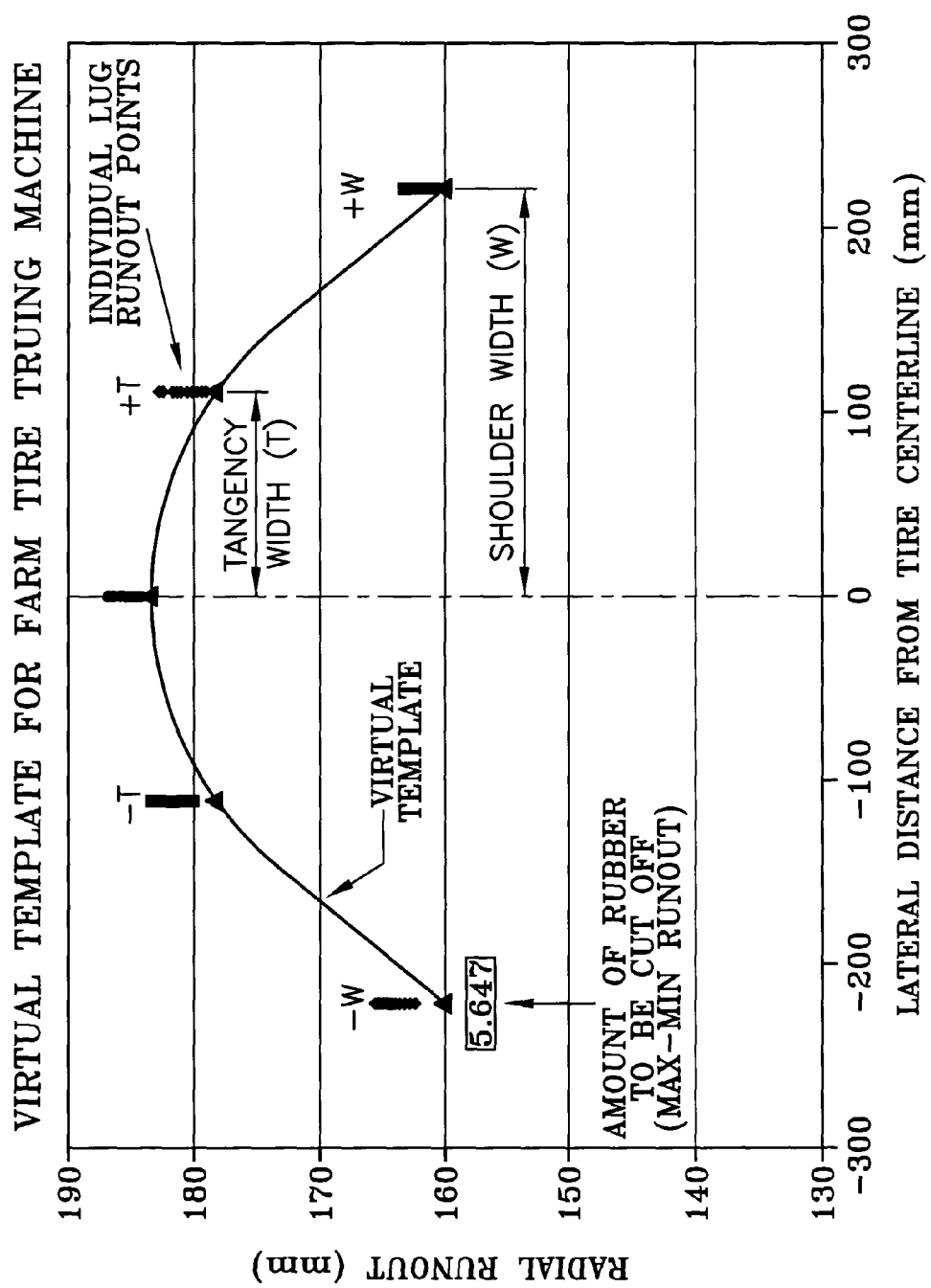
FIG. 17 is an exemplary chart of a virtual template for a corrected profile for a farm tire.

It was preferred that the production tire-truing machine be designed to use virtual templates rather than metal ones. The machine would calculate a new virtual template for each half of each tire. This method would allow the minimal amount of rubber to be removed from each tire while still yielding a zero runout product and satisfying the requirement to shave rubber from all points of all lugs for uniform appearance. In the application described above, it was found important that each lug 72 should be cut so that the finished surface all looked the same around the entire tire 10. In practice, however this is not necessary. Some lugs 72 may be bypassed in the virtual template and therefore there would be a slight appearance difference, however, no functional difference. It is important to understand that it is assumed that all profiles can be fit with two radii on each half of the tire as shown in FIG. 14. The center radii $R_1$ have their centers on the tire centerline. The second radii $R_2$ must be tangent to the first radii at a specified width T from the centerline, the distance W being one-half the total tread arc width. This ensures that a tangency or blending occurs as the radius shift from the first radius $R_1$ to the second radius $R_2$. It is understood on wider tires more radius may be used, however a fairly efficient truing of a tire can occur using only two radii on each side. As an example, we will discuss a situation where a tire is measured at five specific locations across the tread. In that condition the system measures every lug 72 of the tire 10 at five separate locations across the tread centerline $D_0$, both shoulders $D_2$ and at the midpoints $D_1$, chosen in advance to be close to the expected tangency point $D_1$ between the center and the shoulder radii. Then the equipment chooses the lowest lug from each of these five locations for the following calculation. These calculations are performed on each half of the tire independently.

The center or first radius $R_1$ on each side is calculated from the width and the drop from the centerline to the midpoint.

$$R_1 = \frac{(drop_1^2 + T^2)}{2*drop_1} X_1, Y_1 = 0$$

(Center of True); $X_{2L}Y_{2L}$=second tread arc Radius origin

The second radii center and radius $X_2$, $Y_2$, $R_2$ are then calculated as $$X_{2L\&R} = \frac{T^3 - T*W^2 - T*(drop_1 - drop_2)^2 - 2*T*(drop_2 - drop_1)*(drop_1 - R_1)}{2*T^2 - 2*T*W - 2*(drop_2 - drop_1)*(drop_1 - R_1)}$$

$$Y_{2L\&R} = drop_1 - \frac{(T - X_2)*(drop_1 - Rad_1)}{T}$$

Drop $1_L$=Low Pointe
Center-Low Pointe
Tangency width T
Drop $1_R$=other side of centerline $$R_2 = \frac{R_1*(T - X_2)}{T}$$

Will you compare $(X,Y)_2$ & $(X,Y)_1$ $X_{2L}$=left side of centerline; $X_{2R}$=Right side of centerline, $Y_{2L}$=left side $Y_{2R}$=right side.

A small offset should be added to the calculated virtual template to insure that any low spots between the measurements are in fact shaved. This offset can be reduced to a minimum. If desired, checks can be performed to make sure radii, amounts to be removed final runout, etc. are within acceptable limits. If not they can be adjusted resulting in more rubber removal in certain spots. With regard to connicity it is important to understand that when truing a tire from one shoulder to the other shoulder using five independent zones it would be possible to create a rather conical shaped tire where the outside shoulder might be substantially higher than the inside shoulder and the tire would look somewhat cone shaped in the inflated and unloaded condition. This can be minimized in the virtual template by requiring a limit on the amount of connicity that would be tolerated on a trued tire. The virtual templates have this programmed into them so those tires are provided so that out of connicity condition is limited.

Will you compare $R1_L$ &R?
Will you compare $R2_L$ &R?
Stored data 50 lugs max skip each other.

The system, as shown, had the truing system designed as such that an XY shuttle that could either automatically or manually shuttle the truing device 200 to the centerline of the tire 10 and then radially move the truing device 200 to the proper standoff from the tire 10 was provided. The XY axis works in concert with the truing devices Z-axis to move the truing cutter 250 in the proper arc. In addition, two manually moved X and Y end lock carriages ride on the same shuttle that contains the truing device 200. These two outboard carriages each contain the tire runout measurement lasers. The system is capable of supporting two tire stands. The truing system utilizes a virtual template instead of a metal template as discussed. Initially, fifty virtual templates were stored in the controls main memory by tire size or code. The control could then form fit the virtual template to the best fit with the tire runout data collected by the measurement lasers. The overall goal was to qualify tires such that they are true at centerline and within 6 mm and then to trim them to zero runout at the centerline while blending the shoulder thickness accordingly for a fixed virtual template preprogrammed electronic profile or by responding to measurements taken by a laser advancing head of the truing tire to dynamically trim or true that slice of the tire. The concept of limiting oneself to fifty virtual templates per tire code achieved reasonably good results however, it was determined that intuitive logic of the computer system would enable artificial intelligence to actually select and create its own virtual template with any range, therefore creating an unlimited amount of template possibilities with the objective of minimizing the amount of rubber that had to be removed from the tire in order to create a zero runout condition across the tread face. This software simply required that given rules were set within the perimeters of tire truing and measurements such that the software within the guidelines of the rules is able to create from the mathematical formulas the optimum virtual template.

Figure 20:
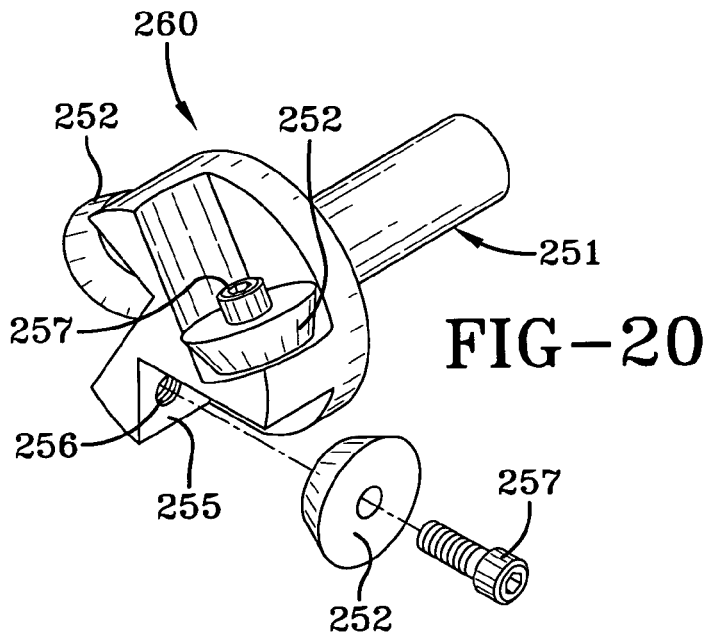
FIG. 20 is an exploded perspective view of the truer cutter.
Figure 21:
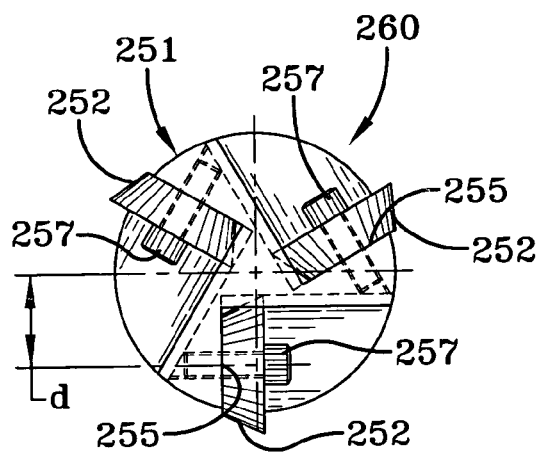
FIG. 21 is an end view of the assembled truer cutter.
Figure 22:
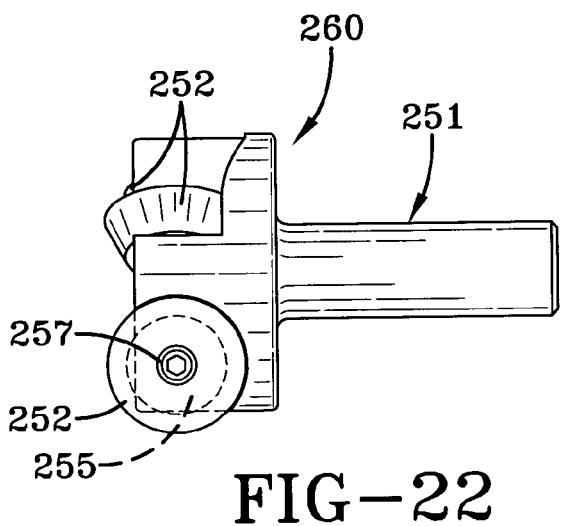
FIG. 22 is a side view of the assembled truer cutter.

In order for the system to work, a truing cutter 260 had to be developed. This truing cutter 260 is the subject of another patent application titled A CUTTER ASSEMBLY FOR CORRECTING TIRE NONUNIFORMITIES U.S. application Ser. No.11/188,320). With reference to the truing cutter 260, initial attempts were to use a 3-inch diameter-cutting wheel. The cutting wheel is a disc that basically shaves rubber off. Alternatively, a 5-inch blade was tried in each of these systems the cutting occurred at limited amounts, in other words, approximately 0.090 of an inch per pass could be cut, and with some optimally, depths up to 0.100 of an inch could be cut with this type of cutting wheel. It was determined that not only did the cutting wheel require multiple passes, but also it limited the smoothness of the cutter. Accordingly, a cutting tool as shown in FIGS. 20, 21 and 22 was developed that was able to cut the lugs 72 in one pass up to a quarter of an inch or more in depth. As shown, the FIG. 21 cutting tool has three circular cutting blades 252 that are mounted to the cutting head 251. Preferably the blades are made of a tool-like steel such as carbide or tungsten carbide. These cutting blades 252 are rotated at very high speeds so fast that they are visually unobservable to the operator. As the leading edge of each cutter blade 252 enters into the lug 72 it cuts and as the blade 252 exits the lug 72 it polishes the lug as it makes a 180° movement from the initial cut position. As the blades 252 come into contact with the lug 72 the first blade cuts and the second blade follows and trims and polishes the surface as the tire traverses there is a smoothing situation occurring that results in a very nice finish on the trued tread lug 72. The critical component of this type of cutter 260 is that each of the three blades 252 is slightly spaced from the centerline. This spacing from the centerline enables the rubber strips of shavings to move to the center and then fall such that they do not block or occlude the cutting head 251 any fashion.

The cutter head 251 provides mounting surfaces 255 oriented 120° apart. Each mounting surface 255 has a threaded fastening hole 256 for attaching a round or circular blade 252 with fasteners 257. The center of the hole 256 is spaced at distance d from the centerline of the cutting head 251 as shown in FIG. 21. Preferably d is about one-half of an inch or less depending on the diameter of the blades 252. As shown the blades 252 were 0.75 inches. This creates a conical opening in the center of the cutter as measured from the blades 252 of about one-half inch. This ensures a large opening for tread shavings to be removed without blocking the cutter 260. The round blades 252 as shown are actually conical in shape with the cutting edge at the largest diameter.

Figure 11:
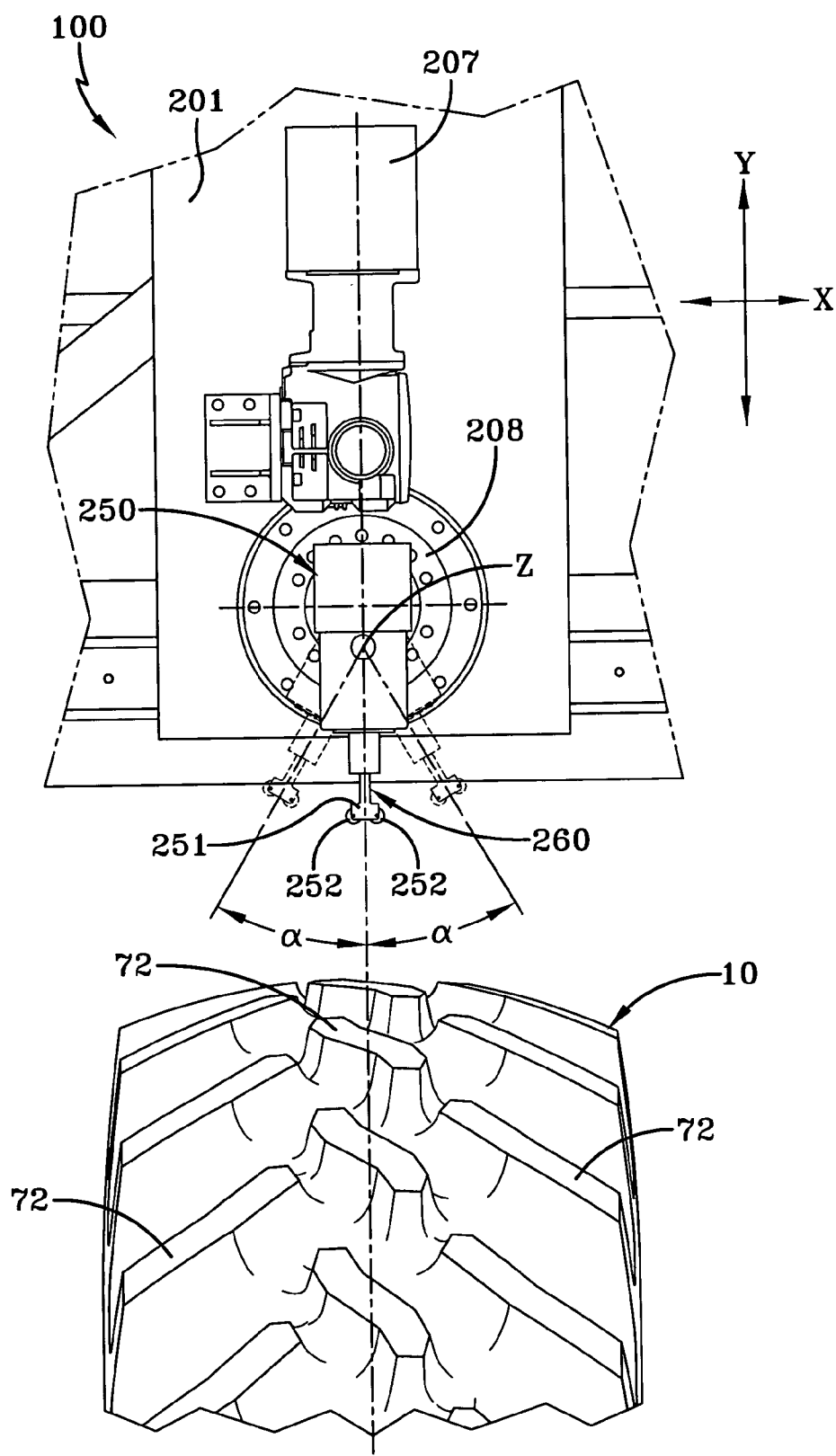
FIG. 11 is a partial top view of the cutting mechanism.

Another important feature of the cutting head is that as designed, it permits the truing carriage to deliver the machine such that in the Z-axis the machine cutting point is always perpendicular to the tire's true axis of rotation. This is a critical feature in that most truing heads that are not adjustable in the Z axis would always be slightly offset from the tire's true radial position. By providing the capability of the truing head to rotate within the angles α (as shown in FIG. 11) and to calculate the exact location of the cutter and to make that translation mathematically, it is possible to maintain the cutting edge at true perpendicularity with the tire's axis. This is far superior to any known cutter currently in use for any tire truing apparatus and it alone is a novel and probably most accurate way of truing a tire permitted primarily through the use of a unique cutter mechanism 260 that enables chunks of cut rubber to simply fall between the cutting blade 252 and to be picked up by the vacuum system. In order to take chunks of rubber a quarter of an inch thick off of a tread lug it is understood that the machine must operate at very high speeds. It operates with a 3.0 horsepower motor at 18,000 rpms or greater and this motor is on a very substantial base so that vibrations are taken out of the equipment. This is important because the cutter 260 must cut cleanly, quickly and not bounce or move in any way in order to achieve this cut. What makes the cutting head in the system novel is that most cutting and truing machines can operate in an X and Y-axis only. This cutting system operates through the X and Y-axis and additionally adjusts in a Z-axis to achieve an optimal contour that as discussed always insures that the cut is absolutely perpendicular to the tire axis.

Figure 18:
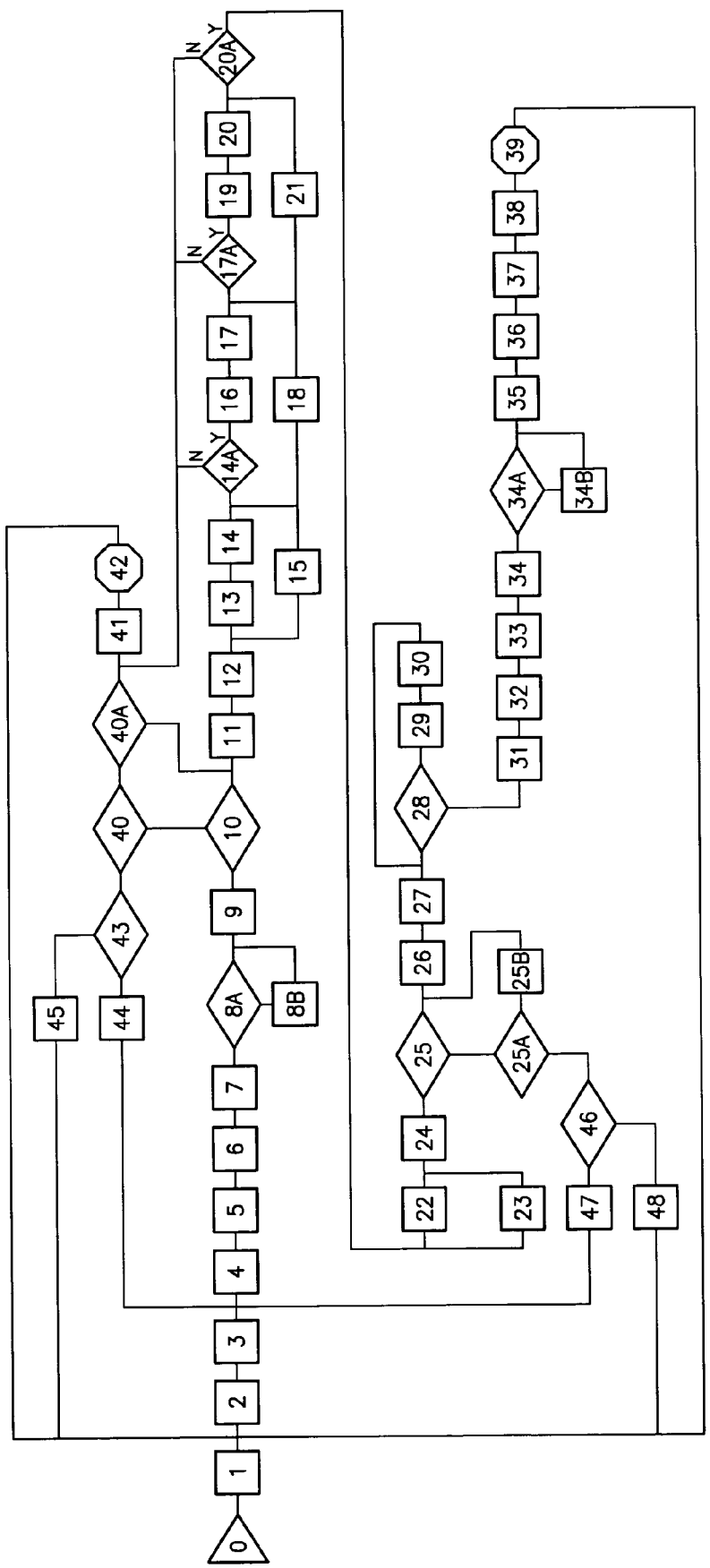
FIG. 18 is a schematic flow diagram of the tire truing process of the present invention.

With reference to the FIG. 18, a process flow chart is illustrated. Each step in the process of measuring and profiling and truing the tire is identified in a numbered block. In FIGS. 19A, 19B, 19C, 19D and 19E each of the numbered blocks from FIG. 18 is defined. The schematic of 18 and the FIGS. 19A through 19E provide a general outline or summary of the procedures that are recommended for truing a tire.

For a better understanding of the actual operation of the apparatus the inventors provide below operating instructions defining the procedures the operator is asked to follow.

OPERATING INSTRUCTIONS

Operating Procedures
1) Make sure that no personnel are near the machine. Place the machine in manual. Verify that the laser carriage is at its rest position. Go to the homing screen and select Home All. Once the axes have stopped moving the operator should go to the status screen and press reset for new tire.
2) Locate tire; record pertinent tire data on paper; roll tire to headstock; initiate scissor lift rise; initiate tailstock in; lock tailstock shaft; inflate tire; initiate scissor life lower.
3) Move to HMI and go to the recipe screen. Select the correct tire code. Enter the pertinent technician information on the operator information screen. Make sure that the warehouse number field is not 0.
4) Select the laser setup screen and position the screen so it is visible from the laser measurement position.
5) Move the laser carriage slide arm to the proper position for the particular tire. Note: It is important that the laser should be placed at the whole number of tire's diameter. For example: 75.3"=>75", 58.7"=>58"
6) Rotate the tire so the first lug is located horizontally in front of the measurement laser. Move the laser carriage over near the mold flash. Adjust the vernier slide so the centerline laser lines up with the mold flash at the first lug. It is strongly recommended that the dot from the measurement laser should be positioned in the valley just before the rise of the first lug.

7) Press the start measurement routine push-button. The HMI screen should display a message:
"Is Tire @ Lug #1? Answer Yes to Home"
Select Yes for the machine to home the tire rotation axis to 0 degrees. The HMI screen should display another message:
"Is Laser at Mold Flash? Answer Yes To Continue."
Select Yes for the machine to reset the laser position to the correct location. Note: The first message will not appear if the warehouse number is 0. Instead the following message will be displayed:
"You must first enter a Warehouse Number!!"
If this occurs the operator must go back to the operator information screen and enter a warehouse number.
8) If the HMI screen indicates that the laser carriage is in the correct position then continue, otherwise move the laser carriage to the desired position and the HMI will indicate that the laser is in the correct position. Lock down the laser carriage. The blue light on the Measure Run-Out light should be on. Press the blue push button and release. The tire will complete one revolution and the data will be analyzed.
9)
If there are no problems with the data the HMI will display:
"Data is Ok. Yes-Move to Next Measure. No- More Info."
Selecting Yes will prompt the machine to measure the next slice of the tire, selecting No will prompt another message. The next message is:
"Answer Yes to Retake the Measure, No to Quit"
Selecting Yes will illuminate the blue Measure Run-Out light and repeat the measurement routine. Selecting No will cause an end to the measurement routine.
If the wrong number of lugs are detected, the HMI will display the message:
"# of Lugs Error. Yes-More Info."
Select Yes and the HMI will display:
"Data not Ok. Yes-Move to Next Measure. No- More Info."
Selecting Yes will prompt the machine to measure the next slice of the tire, selecting No will prompt another message. The next message is:
"Answer Yes to Retake the Measure, No to Quit"
Selecting Yes will illuminate the blue Measure Run-Out light and repeat the measurement routine. Selecting No will cause an end to the measurement routine.
10) Once the first slice of the tire is measured properly it is time to move the laser carriage to the second position. With the guidance of the laser setup screen it is relatively easy to position the carriage to the correct position. Once the laser carriage is in position it should be locked down. The blue light on the Measure Run-Out light should be on. Press the blue push button and release. The tire will spot quickly to the first lug, complete one revolution, and the data will be analyzed.
11)
If this tire has no TIR, Flat Spot, RR01H, or other problems, the HMI will display:
"Do You want to True this tire. Yes-Continue No-Finish."
This tire does not need to be trued, however it still is able to be trued. Selecting Yes will prompt the machine to measure the next slice of the tire, selecting No will cause an end to the measurement routine. The tire will be spotted to the RR01H low spot and the measuring routine will be complete.
If the wrong number of lugs are detected, the HMI will display the message:
"# of Lugs Error. Lugs XX Yes-More Info."
Select Yes and a new message will appear. HMI will display:
"Answer Yes-To Retake Measurement. No-Continue."
Selecting Yes will illuminate the blue Measure Run-Out light and repeat the measurement routine. Selecting No will continue with the following options.
If the TIR is over the threshold limit the HMI will display the message:
"TIR Limit XX.XXXX Need to True. Yes-More Info."
If the TIR is over the Truing Limit the HMI will display the message:
"TIR Error XX.XXXX Truing Limit. Yes-More Info."
Selecting Yes will continue with the following options.
If the analysis determines there are Flat Spots on the tire the HMI will display the message:
"Flat Spot Warn. Answer Yes to See Values No—To Finish."
Answer No to continue with the following options, or Yes to See the following messages:
"Number of Lugs with FlatSpots XX" and "Lug Number XX"
Once these messages are displayed the machine continues.
If the RR01H is over the threshold limit the HMI will display the message:
"RR01H Error. XX.XXXX Need to True. Yes-More Info."
Selecting Yes will continue with the following options.
Once each of these options is done, the HMI will display:
"Do You want to True this tire. Yes-Continue No-Finish."
This tire does need to be trued, however there is still the option not to true the tire. Selecting Yes will prompt the machine to measure the next slice of the tire, selecting No will cause an end to the measurement routine. The tire will be spotted to the RR01H low spot and the measuring routine will be complete.
12) Once the second slice of the tire is measured properly it is time to move the laser carriage to the third position. With the guidance of the laser setup screen it is relatively easy to position the carriage to the correct position. Once the laser carriage is in position it should be locked down. The blue light on the Measure Run-Out light should be on. Press the blue push button and release. The tire will spot quickly to the first lug, then complete one revolution, and the data will be analyzed.
13)
If this tire has no TIR, Flat Spot, or other problems, the HMI will display:
"Data is Ok. Yes-Move to Next Measure. No- More Info."
Selecting Yes will prompt the machine to measure the next slice of the tire, selecting No will prompt another message. The next message is:
"Answer Yes to Retake the Measure, No to Quit"
Selecting Yes will illuminate the blue Measure Run-Out light and repeat the measurement routine. Selecting No will cause an end to the measurement routine. The tire will be spotted to the RR01H low spot and the measuring routine will be complete.
If the wrong number of lugs are detected, the HMI will display the message:
"# of Lugs Error. Lugs XX Yes-More Info."
Select Yes to continue with the following options.
If the TIR is over the threshold limit the HMI will display the message:
"TIR Limit XX.XXXX Need to True. Yes-More Info."

If the TIR is over the Truing Limit the HMI will display the message:

"TIR Error XX.XXXX Truing Limit. Yes-More Info."

Selecting Yes will continue with the following options.

If the analysis determines there are Flat Spots on the tire the HMI will display the message "Flat Spot Warn. Answer Yes to See Values No—To Finish."

Answer No to continue or Yes to See the following messages:

"Number of Lugs with FlatSpots XX" and "Lug Number XX"

Once these messages are displayed the machine continues.

Once each of these options is done, the HMI will display:

"Data not Ok. Yes-Move to Next Measure. No- More Info."

Selecting Yes will prompt the machine to measure the next slice of the tire, selecting No will prompt another message. The next message is:

"Answer Yes to Retake the Measure, No to Quit"

Selecting Yes will illuminate the blue Measure Run-Out light and repeat the measurement routine. Selecting No will cause an end to the measurement routine. The tire will be spotted to the RR01H low spot and the measuring routine will be complete.

The preceding two steps continue for the rest of the measurements. When the measurement process is completed continue to the next step.

If the measurement process was terminated early, then the operator should move to the load/unload position, place the proper markings on the tire, and initiate the tire removal cycle.

If the measurement process was completed but the operator does not wish to true the tire, then the operator should go to the Message Screen, press the Final Spot pushbutton to spot the tire to the RR01H low spot, move to the load/unload position, place the proper markings on the tire, and initiate the tire removal cycle.

14) The operator must go to the Virtual Template Screen on the HMI. This screen displays the TIR at each of the measurement locations as well as the connicity. The operator must choose whether they would like to make one or two passes. If one of the TIR measurements is greater than the truing limit, then two passes must be made. If two passes are chosen the operator must enter how much run-out should be removed on the second pass. Once that is entered the amount removed on the first pass is automatically calculated. There are two other options for the operator. The operator may desire to change the radial and angular offset of the truer blade. The radial offset directly affects the Y direction of the virtual template. A negative radial offset moves the virtual template in towards the tire by the offset amount, while a positive radial offset moves the virtual template away from the tire by the offset amount. The angular offset directly affects the z-axis of the virtual template. A negative angular offset adjusts the z-axis of the virtual template clockwise the offset amount, while a positive angular offset adjusts the z-axis of the virtual template counter-clockwise the offset amount. The operator creates the virtual template by pressing the Create Template pushbutton. When the template is complete the HMI displays the following message "The Virtual Template Has Been Created! Please Go To The Graph Screen To View The Template. If You Wish To True This Tire Go To The Truer Setup Screen To Proceed"

Follow the message's instruction to view the virtual template and then continue.

15) Place the machine in automatic. Select the truer setup screen on the HMI. Verify that no other personnel are in the area. Press the truer carriage to centerline push button until the carriage begins to move. This should be 5 seconds. During those five seconds the safety beacon will blink and the siren will sound. The truer carriage should slowly make its way to the centerline of the tire. When the carriage stops, the operator should verify if the centerline of the truer carriage laser line-light is on the mold flash. If it is not then the operator should slowly jog the truer carriage into place. Meanwhile the HMI will be displaying the following message:

"Is Truer Carriage at Mold Flash?"

Once it is in place the operator should answer yes to the question. The HMI will display this message three times:

"Please lock down the truer carriage."

The operator should walk over and lock down the truer carriage.

16) The operator should press and release the move to starting position push-button on the HMI. The x-axis of the truer head should move into position. Once it is in position the y-axis and z-axis should move into position. Remember, if the cutter off/on selector switch is in the on position the cutter will be rotating at this time. When the axes of motion stop the operator should inspect the position quickly to see if the starting position looks correct.

17) The operator should press and release the start truing process push-button. This should initiate the tire to start rotating with the top of the tire down toward the cutter. The x-axis, y-axis, and z-axis are all geared to the tire rotation axis and they move coordinated with the profile of the virtual template.

18) When the x-axis, y-axis, and z-axis finish the virtual template the y-axis retreats to it's full out position and the tire rotation axis stops. Once the y-axis is in position the x-axis and z-axis move back to their rest positions. If two passes are needed then steps 16–17 should be repeated for the second pass. When the truing process is complete, the operator should unlock the truer carriage and then press the truer carriage to home push-button for 5 seconds. During those five seconds the safety beacon will blink and the siren will sound. The truer carriage should slowly make its way to its rest position.

19) Once the truer carriage is home the HMI will announce

"The Truing Of The Tire Has Been Completed! Please Move the Laser Back Over To The Mold Flash And Proceed With The Post Truing Laser Measurements"

The operator should select the laser setup screen and position the screen so it is visible from the laser measurement position. Move the laser carriage slide arm to the proper position for the particular tire.

20) The operator should unlock the laser carriage and move it to the desired position on the laser screen. Once the laser carriage is in position it should be locked down. The operator must press the start measurement routine push-button to initiate the post-truing measurements. Then the blue illuminated start measurement cycle should be pressed to allow the tire to spot quickly to the first lug and then make one-revolution to collect the post trued lug data.

21)

If there are no problems with the data the HMI will display:

"Data is Ok. Yes-Move to Next Measure. No-More Info."

Selecting Yes will prompt the machine to measure the next slice of the tire, selecting No will prompt another message. The next message is:

"Answer Yes to Retake the Measure, No to Quit"

Selecting Yes will illuminate the blue Measure Run-Out light and repeat the measurement routine. Selecting No will cause an end to the measurement routine.

If the wrong number of lugs are detected, the HMI will display the message:

"# of Lugs Error. Yes-More Info."

Select Yes and a new message will appear. HMI will display:

"Data not Ok. Yes-Move to Next Measure. No-More Info."

Selecting Yes will prompt the machine to measure the next slice of the tire, selecting No will prompt another message. The next message is:

"Answer Yes to Retake the Measure, No to Quit"

Selecting Yes will illuminate the blue Measure Run-Out light and repeat the measurement routine. Selecting No will cause an end to the measurement routine. The tire will be spotted to the RR01H low spot and the measuring routine will be complete.

22) Once the first slice of the tire is measured properly it is time to move the laser carriage to the second position. With the guidance of the laser setup screen it is relatively easy to position the carriage to the correct position. Once the laser carriage is in position it should be locked down. The blue light on the Measure Run-Out light should be on. Press the blue push button and release. The tire will spot quickly to the first lug, complete one revolution, and the data will be analyzed.

23)

If this tire has no TIR, Flat Spot, RR01H, or other problems, the HMI will display:

"Post-Trued analysis done. Yes to spot to low lug."

Selecting Yes will cause the tire to be spotted to the RR01H low spot and the measuring routine will be complete.

If the wrong number of lugs are detected, the HMI will display the message:

"# of Lugs Error. Lugs XX Yes-More Info."

Select Yes and a new message will appear. HMI will display:

"Answer Yes-To Retake Measurement. No—Continue."

Selecting Yes will illuminate the blue Measure Run-Out light and repeat the measurement routine. Selecting No will continue with the following options.

If the TIR is over the threshold limit the HMI will display the message:

"TIR Limit XX.XXXX Need to True. Yes-More Info."

If the TIR is over the Truing Limit the HMI will display the message

"TIR Error XX.XXXX Truing Limit. Yes-More Info."

Selecting Yes will continue with the following options.

If the analysis determines there are Flat Spots on the tire the HMI will display the message "Flat Spot Warn. Answer Yes to See Values No—To Finish."

Answer No to continue with the following options, or Yes to See the following messages, "Number of Lugs with FlatSpots XX" and "Lug Number XX"

Once these messages are displayed the machine continues.

If the RR01H is over the threshold limit the HMI will display the message

"RR01H Error. XX.XXXX Need to True. Yes-More Info."

Selecting Yes will continue with the following options.

Once each of these options is done, the HMI will display:

"Post-Trued analysis done. Yes to spot to low lug."

Selecting Yes will cause the tire to be spotted to the RR01H low spot and the measuring routine will be complete.

24) The operator should move to the load/unload position, place the proper markings on the tire, and initiate the tire removal cycle.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full-intended scope of the invention as defined by the following appended claims.

What is claimed is:

1. A method of correcting the radial runout variation across the peripheral surface of the tread lugs of a tire; comprising the steps of:

locating the tire's center axis;

measuring a plurality of radial points in different locations about a circumference of the tire in each of several circumferential planes located between the tread shoulders; wherein the circumferential planes correspond to tread lugs;

determining a radial low point from the plurality of radial points in different locations for each circumferential plane;

determining a virtual tread profile from the radial low points; and engaging a tread removal means to remove tread rubber to match the tread profile to the virtual tread profile.

2. The method of claim 1 wherein the measurements are taken in at least three circumferential planes.

3. The method of claim 1 wherein the measurements are taken in at least five circumferential planes.

4. The method of claim 1 wherein the virtual tread profile is asymmetrical.

5. The method of claim 1 further includes controlling the movement of the tread removal means by directing the movements to follow the virtual tread profile.

6. The method of claim 1 further includes controlling the rotational movement of the tire as the tread removal means traverses across the tread.

7. An apparatus for measuring a tire tread profile and truing said tire comprises a base having linear bearing guide rails for directing movement in an X direction parallel to the axis of the tire to be measured and trued;

a profile measuring device mounted on a movable sled, the sled having linear bearings attached to the guide rail bearings;

a device for measuring a plurality of radial points in different locations about a circumference of the tire in each of several circumferential planes located between the tread shoulders; wherein the circumferential planes correspond to tread lugs;

calculation means for determining a radial low point from the plurality of radial points in different locations for each circumferential plane and then determining a virtual tread profile from the radial low points a truing device assembly mounted on a movable carriage, the carriage having linear bearings attached to the guide rail bearings; and a tire rotation device.

8. The apparatus of claim 7 further comprises:

an electronic control system including a computer and software for compiling measurement data and establishing a virtual template to true the tire; the control system directs the movement of the truing device assembly.

9. The apparatus of claim 7 wherein the truing device assembly includes a truing cutter, truer device assembly having a Y direction movable carriage mounted to the X direction movable sled.

10. The apparatus of claim 9 wherein the truer cutter includes a Z axis pivot system.

* * * * *